US012750119B2

(12) United States Patent
Yuan et al.

(10) Patent No.: US 12,750,119 B2
(45) Date of Patent: Sep. 29, 2026

(54) PROACTIVE BEAM REPORT TRANSMISSION FOR BEAM FAILURE RECOVERY

(71) Applicant: QUALCOMM Incorporated, San Diego, CA (US)

(72) Inventors: Fang Yuan, Beijing (CN); Yan Zhou, San Diego, CA (US); Jelena Damnjanovic, Del Mar, CA (US); Luanxia Yang, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 18/572,872

(22) PCT Filed: Sep. 3, 2021

(86) PCT No.: PCT/CN2021/116355
§ 371 (c)(1),
(2) Date: Dec. 21, 2023

(87) PCT Pub. No.: WO2023/028975
PCT Pub. Date: Mar. 9, 2023

(65) Prior Publication Data
US 2024/0313846 A1 Sep. 19, 2024

(51) Int. Cl.
*H04W 28/02* (2009.01)
*H04B 7/06* (2006.01)
(Continued)

(52) U.S. Cl.
CPC ...... *H04B 7/06964* (2023.05); *H04W 72/046* (2013.01); *H04W 76/19* (2018.02)

(58) Field of Classification Search
CPC .... H04L 5/005; H04W 76/19; H04W 72/046; H04W 72/042; H04W 24/10; H04B 17/318; H04B 7/088; H04B 7/0695; H04B 17/17
See application file for complete search history.

(56) References Cited

U.S. PATENT DOCUMENTS

2021/0185756 A1* 6/2021 Cirik ...................... H04B 7/088
2023/0300645 A1* 9/2023 Kwak .................. H04W 24/08 370/242

OTHER PUBLICATIONS

AT&T: "Enhancements on Multi Beam Operation", 3GPP Draft, 3GPP TSG RAN WG1 Meeting # 97, R1-1907156 Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Reno, Nevada, May 13, 2019-May 17, 2019 May 13, 2019 (May 13, 2019), 5 Pages, XP051728602, chapter 3.

(Continued)

*Primary Examiner* — Phuoc H Doan
(74) *Attorney, Agent, or Firm* — Loza & Loza, LLP

(57) ABSTRACT

The aspects described herein may improve beam management at an apparatus (e.g., a UE) by allowing the apparatus to proactively transmit a beam report including information that may avoid a full beam failure recovery (BFR) procedure at the apparatus. The apparatus receives a set of beam failure detection reference signals and transmits a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

16 Claims, 14 Drawing Sheets

(51) Int. Cl.
*H04W 72/044* (2023.01)
*H04W 76/19* (2018.01)

(56) References Cited

OTHER PUBLICATIONS

International Search Report and Written Opinion—PCT/CN2021/116355—ISA/EPO—Apr. 3, 2022.
LG Electronics Inc: "Consideration on Truncated Format on SCell BFR MAC CE", 3GPP Draft, 3GPP TSG-RAN2#109-e, R2-2001304, 3rd Generation Partnership Project (3GPP), Mobile Competence Centre, 650, Route Des Lucioles, F-06921 Sophia-Antipolis Cedex, France, vol. Ran WG2, No. Online, Feb. 24, 2020-Mar. 6, 2020 Feb. 14, 2020 (Feb. 14, 2020), 2 Pages, XP051849612, [retrieved on Feb. 14, 2020] chapter 2.
NTT Docomo: "Remaining Issues on Beam Recovery", 3GPP TSG RAN WG1 Meeting #91, R1-1720804, 3rd Generation Partnership Project, Mobile Competence Centre, 650, Route Des Lucioles, F-06921 Sophia Antipolis Cedex, France, No. Reno, USA, Nov. 27, 2017-Dec. 1, 2017, Nov. 18, 2017, pp. 1-3, XP051370233.

* cited by examiner

PROACTIVE BEAM REPORT TRANSMISSION FOR BEAM FAILURE RECOVERY

CROSS-REFERENCE TO RELATED APPLICATION(S)

This application is the U.S. national stage of PCT patent application number PCT/CN2021/116355 filed on Sep. 3, 2021.

BACKGROUND

Technical Field

The present disclosure relates generally to communication systems, and more particularly, to a proactive beam report transmission from a user equipment (UE) for beam failure recovery.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) in a wireless communication network (e.g., a 5G NR network) may establish one or more beams for communication with a base station. The UE may then perform beam management by measuring the radio link qualities of beam failure detection reference signals in a set of beam failure detection reference signals configured for the UE. The UE may detect a beam failure event when all of the beam failure detection reference signals in the set of beam failure detection reference signals are in a failure condition. A beam failure detection reference signal may be in a failure condition when its radio link quality is below a threshold radio link quality (also referred to as a quality threshold).

The UE may need to perform a full beam failure recovery (BFR) procedure when the radio link qualities for all reference signals (RSs) in a beam failure recovery reference signal (BFD-RS) set are worse than (e.g., below) a quality threshold. A full beam failure recovery procedure, however, may result in substantial changes to the beams used at the UE. This may cause link interruptions and may reduce the performance of the UE. The aspects described herein may improve beam management at the UE by allowing the UE to proactively transmit a beam report indicating a partial beam failure when less than all reference signals (RSs) in a BFD-RS set are worse than a quality threshold. In some examples, the beam report may allow the UE to avoid a full beam failure recovery procedure.

In an aspect of the disclosure, a method, a computer-readable medium, and an apparatus are provided. For example, the apparatus may be a UE. The apparatus receives a set of beam failure detection reference signals and transmits a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

In some examples, the apparatus further receives a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold.

In some examples, the apparatus further receives a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by the amount greater than or equal to a difference threshold.

In some examples, the apparatus optionally receives control information in response to the beam report.

In some aspects of the present disclosure, a computer-readable medium storing computer executable code is provided. The code when executed by a processor cause the processor to: receive a set of beam failure detection reference signals and transmit a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

In some examples, the beam report includes an index value identifying the first beam failure detection reference signal in the set of beam failure detection reference signals.

In some examples, the code when executed by the processor further cause the processor to: receive a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold.

In some examples, the beam report further includes a second index value identifying the first beam failure detection reference signal when the radio link quality of the new beam identification reference signal exceeds the radio link quality of the first beam failure detection reference signal, or identifying the second beam failure detection reference signal when the radio link quality of the new beam identification reference signal exceeds the radio link quality of the second beam failure detection reference signal.

In some examples, the code when executed by the processor further cause the processor to: receive a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by the amount greater than or equal to a difference threshold.

In some examples, the beam report includes a medium access control (MAC) control element (CE) containing a field for indicating the partial beam failure. In some examples, a value in the field for indicating the partial beam failure indicates whether the radio link quality of at least the first beam failure detection reference signal is less than the quality threshold and the radio link quality of at least the second beam failure detection reference signal is greater than or equal to the quality threshold. In some examples, the field for indicating the partial beam failure is associated with a component carrier.

In some examples, the beam report includes a medium access control (MAC) control element (CE) containing a first field and a second field, wherein a first value in the first field indicates whether the radio link quality of at least the first beam failure detection reference signal is less than the quality threshold and the radio link quality of at least the second beam failure detection reference signal is greater than or equal to the quality threshold, and wherein the second field includes the index value identifying the first beam failure detection reference signal in the set of beam failure detection reference signals when the radio link quality of at least the first beam failure detection reference signal is less than the quality threshold.

In some examples, the beam report includes a medium access control (MAC) control element (CE), and wherein the MAC-CE is transmitted in an uplink data channel allocated to the apparatus in a serving cell.

In some examples, the beam report includes a medium access control (MAC) control element (CE), wherein the MAC-CE is transmitted in an uplink data channel allocated to the apparatus in a serving cell when a number of padding bits for the uplink data channel is greater than or equal to a total number of bits included in the MAC-CE and a sub-header of the MAC-CE.

In some examples, the beam report includes a medium access control (MAC) control element (CE) containing at least a first field, wherein a first value in the first field indicates whether the radio link quality of at least the first beam failure detection reference signal is less than the quality threshold and the radio link quality of at least the second beam failure detection reference signal is greater than or equal to the quality threshold.

In some examples, the medium access control (MAC) control element (CE) further contains a second field, wherein the second field includes the second index value identifying the first beam failure detection reference signal when the radio link quality of the new beam identification reference signal exceeds the radio link quality of the first beam failure detection reference signal by the amount greater than or equal to the difference threshold, or identifying the second beam failure detection reference signal when the radio link quality of the new beam identification reference signal exceeds the radio link quality of the second beam failure detection reference signal by the amount greater than or equal to the difference threshold.

In some examples, the medium access control (MAC) control element (CE) further contains a third field, wherein the third field includes the first index value identifying the new beam identification reference signal when the radio link quality of the new beam identification reference signal exceeds at least one of the radio link quality of the first beam failure detection reference signal or the radio link quality of the second beam failure detection reference signal by the amount greater than or equal to the difference threshold.

In some examples, the code when executed by the processor further cause the processor to receive control information in response to the beam report.

In some aspects of the present disclosure, an apparatus for wireless communication includes: means for receiving a set of beam failure detection reference signals and means for transmitting a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

In some examples, the apparatus further includes means for receiving a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold.

In some examples, the apparatus further includes means for receiving a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by the amount greater than or equal to a difference threshold.

In some examples, the apparatus further includes means for receiving control information in response to the beam report.

In an aspect of the disclosure, a method, a computer-readable medium, and an apparatus are provided. For example, the apparatus may be a base station. The apparatus transmits a set of beam failure detection reference signals and receives, from a user equipment (UE), a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

In some examples, the apparatus further transmits a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold. In some aspects of the disclosure, the apparatus optionally transmits control information in response to the beam report.

In some aspects of the present disclosure, a computer-readable medium storing computer executable code is provided. The code when executed by a processor cause the processor to: transmit a set of beam failure detection reference signals and receive, from a user equipment (UE), a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

In some examples, the beam report includes an index value identifying the first beam failure detection reference signal in the set of beam failure detection reference signals.

In some examples, the code when executed by the processor further cause the processor to transmit a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold.

In some examples, the beam report further includes a second index value identifying the first beam failure detection reference signal when the radio link quality of the new beam identification reference signal exceeds the radio link quality of the first beam failure detection reference signal, or identifying the second beam failure detection reference signal when the radio link quality of the new beam identification reference signal exceeds the radio link quality of the second beam failure detection reference signal.

In some examples, the code when executed by the processor further cause the processor to transmit a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by the amount greater than or equal to the difference threshold.

In some examples, the code when executed by the processor further cause the processor to optionally transmit control information in response to the beam report.

In some aspects of the present disclosure, an apparatus for wireless communication includes: means for transmitting a set of beam failure detection reference signals and receiving, from a user equipment (UE), a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

In some examples, the apparatus further includes means for transmitting a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold.

In some examples, the apparatus further includes means for transmitting a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by the amount greater than or equal to the difference threshold.

In some examples, the apparatus further includes means for transmitting control information in response to the beam report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
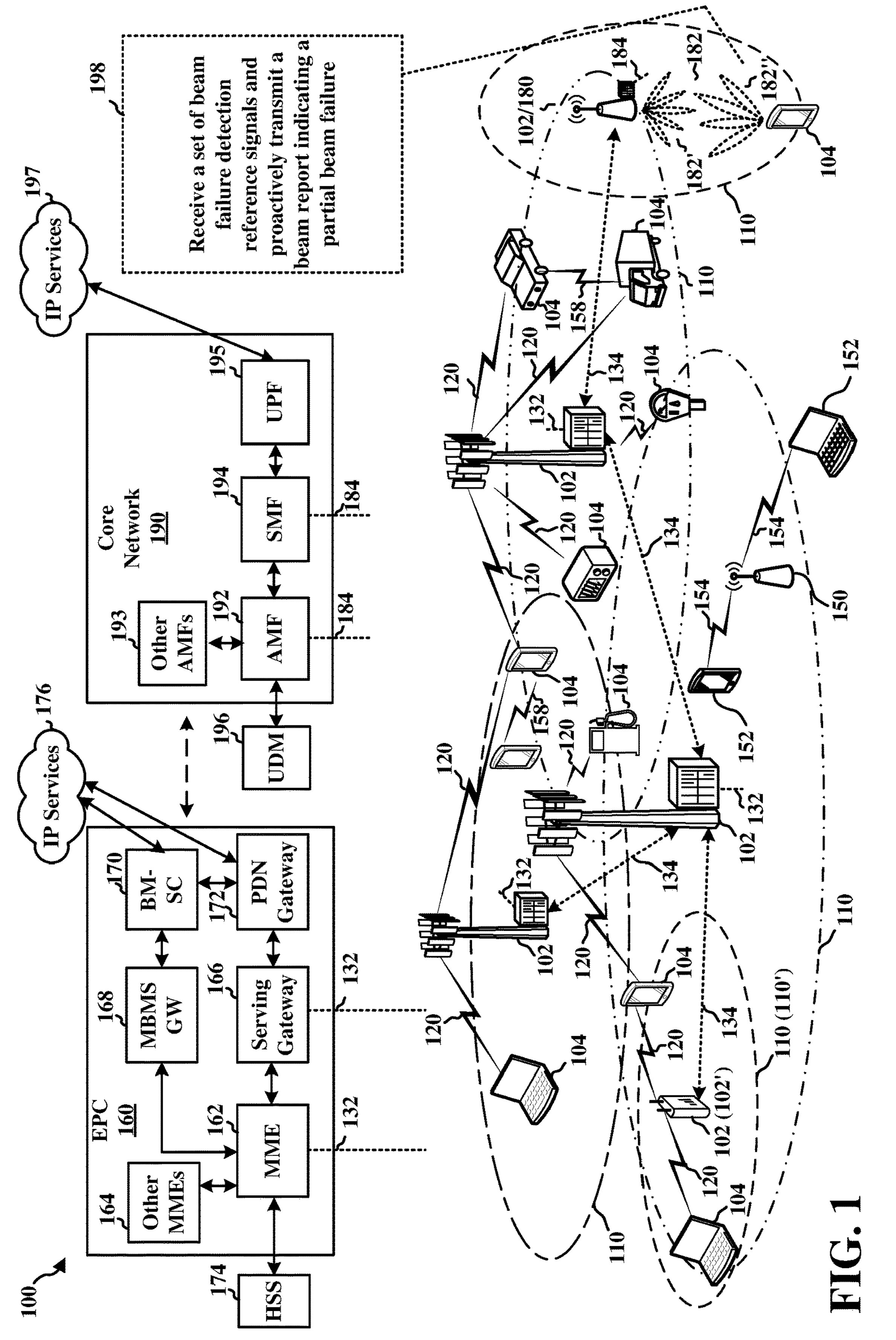
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive a set of beam failure detection reference signals and proactively transmit a beam report indicating a partial beam failure (198). Although the following description may be focused on 5G NR, the concepts described herein may be applicable to other similar areas, such as LTE, LTE-A, CDMA, GSM, and other wireless technologies.

Figures 2A, 2B, 2C, 2D:
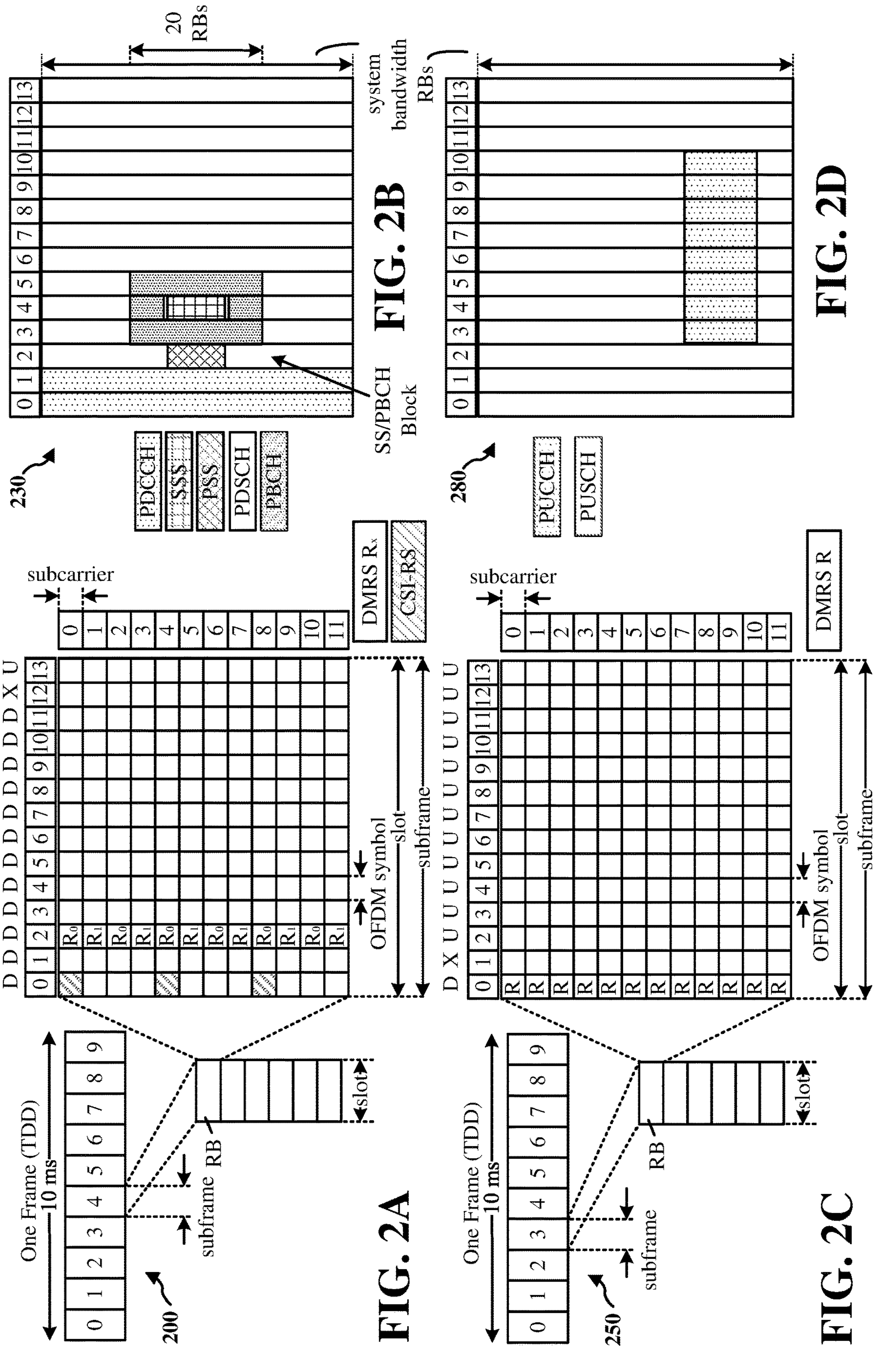
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
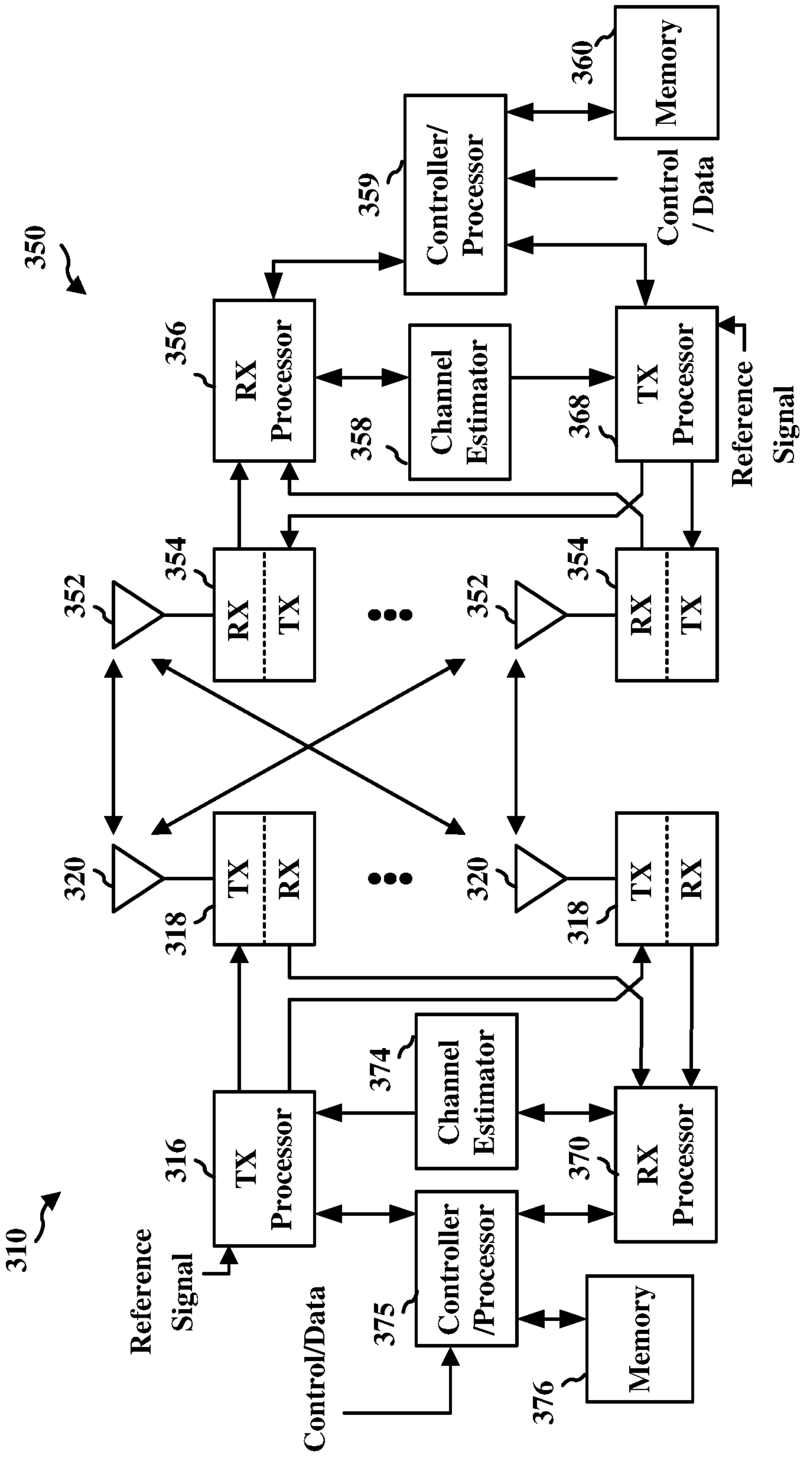
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

A UE may operate in a discontinuous reception (DRX) mode. The DRX mode may refer to a power savings feature where a UE is provided sleeping opportunities (e.g., based on a DRX cycle) so that the UE does not always have to monitor the downlink channels. For example, a DRX cycle may include an ON duration during which the UE should monitor the PDCCH and an OFF duration during which the UE may turn off its receiver circuitry and skip reception of downlink channels for battery saving purposes.

When a UE is connected to a wireless communication network (e.g., a 5G NR network) and is operating in a non-discontinuous reception mode (non-DRX mode), the physical layer in the UE may provide an indication to higher layers when the radio link quality for all corresponding resource configurations in a set of resources that the UE uses to assess the radio link quality is worse than a radio link quality threshold (also referred to as a quality threshold), such as a threshold $Q_{out,LR}$. For example, the physical layer may inform the higher layers when the radio link quality is worse than the threshold $Q_{out,LR}$ with a periodicity determined by the maximum between the shortest periodicity among the SS/PBCH blocks on the PCell or the PSCell and/or the periodic CSI-RS configurations in the set that the UE uses to assess the radio link quality and 2 milliseconds (ms). When the UE is in a DRX mode of operation, the physical layer may provide an indication to higher layers when the radio link quality is worse than the threshold $Q_{out,LR}$ with an appropriate periodicity that considers the length of a DRX cycle applied at the UE.

A wireless communication network (e.g., a base station) may facilitate beam refinement and/or beam tracking by supporting one or more features, such as beam measurement, beam reporting, beam refinement and/or beam selection triggered by beam indication (e.g., without a channel state information (CSI) request from a base station), UE-initiated beam selection/activation based on beam measurement (e.g., without beam indication or activation from a base station), semi-static network-configured beam without beam indication and selection (e.g., measurement/reporting), SSB grouping to reduce beam training, and/or aperiodic beam measurement/reporting based on multiple resource sets for reducing beam measurement latency.

In some wireless communication networks (e.g., 5G NR), a beam failure recovery (BFR) event may occur only when the radio link qualities for all reference signals (RSs) in a beam failure determination reference signal (BFD-RS) set are worse than (e.g., below) a quality threshold. In some examples, a parameter $Q_{out,LR}$ may represent the quality threshold. In some examples, the UE may assess the radio link quality of a beam failure detection reference signal based on a reference signal received power measurement, a block error rate (BLER) measurement, and/or or other suitable metrics.

For example, the UE may assess the radio link quality of a beam failure detection reference signal by measuring the reference signal received power of the beam failure detection reference signal and determining whether the measured reference signal received power is below a threshold reference signal received power (also referred to as rsrp-ThresholdBFR). In this example, the threshold reference signal received power may serve as a quality threshold. For example, the threshold reference signal received power may be a number in units of decibels (dB). In some examples, the UE may assess the radio link quality of a beam failure detection reference signal by measuring a block error rate (BLER) of the beam failure detection reference signal and determining whether the measured BLER is below a threshold BLER value (e.g., 10%). In this example, the threshold BLER value may serve as a quality threshold.

A UE may need to perform a full beam failure recovery (BFR) procedure when the radio link qualities for all reference signals (RSs) in a BFD-RS set are worse than (e.g., below) a quality threshold. A full BFR procedure, however, may result in substantial changes to the beams used at the UE and/or at the network (e.g., a base station) for wireless communications. For example, during a full BFR procedure, a UE may need to reset all the beams for the PUCCH. This may cause link interruptions, resulting in UE processing overhead, delays, and/or a degradation of a user experience.

In some examples, a wireless communication network (e.g., a base station in a 5G NR network) may support UE-initiated beam selection/activation. For example, a base station may allow a UE to proactively perform beam management operations based on beam measurements.

A UE beam management procedure may include measurements (also referred to as beam measurements) of beam failure detection reference signals (BFD-RSs) in a beam failure detection reference signal (BFD-RS) set and/or new beam identification reference signals (NBI-RSs) in a new beam identification reference signal (NBI-RS) set. In some aspects of the disclosure, to avoid a full BFR procedure, a UE may proactively transmit a beam report associated with a beam failure recovery (BFR) procedure based on the beam measurements in a scenario where at least one beam failure detection reference signal in the BFD-RS set is in failure and at least one beam failure detection reference signal in the BFD-RS set is not in failure. This scenario may be referred to as partial beam failure or a partial beam failure event. Therefore, in some of the aspects described herein, the UE may proactively generate and transmit a beam report based on the beam measurements when the BFD-RS set includes at least two beam failure detection reference signals and less than all the beam failure detection reference signals in the BFD-RS set are in a failure condition.

In some examples, a beam failure detection reference signal or a new beam identification reference signal may be considered to be in a failure condition when the radio link quality of the beam failure detection reference signal or the new beam identification reference signal is below a quality threshold (e.g., the threshold $Q_{out,LR}$). In some examples, a base station may provide the quality threshold to the UE.

Figure 4:
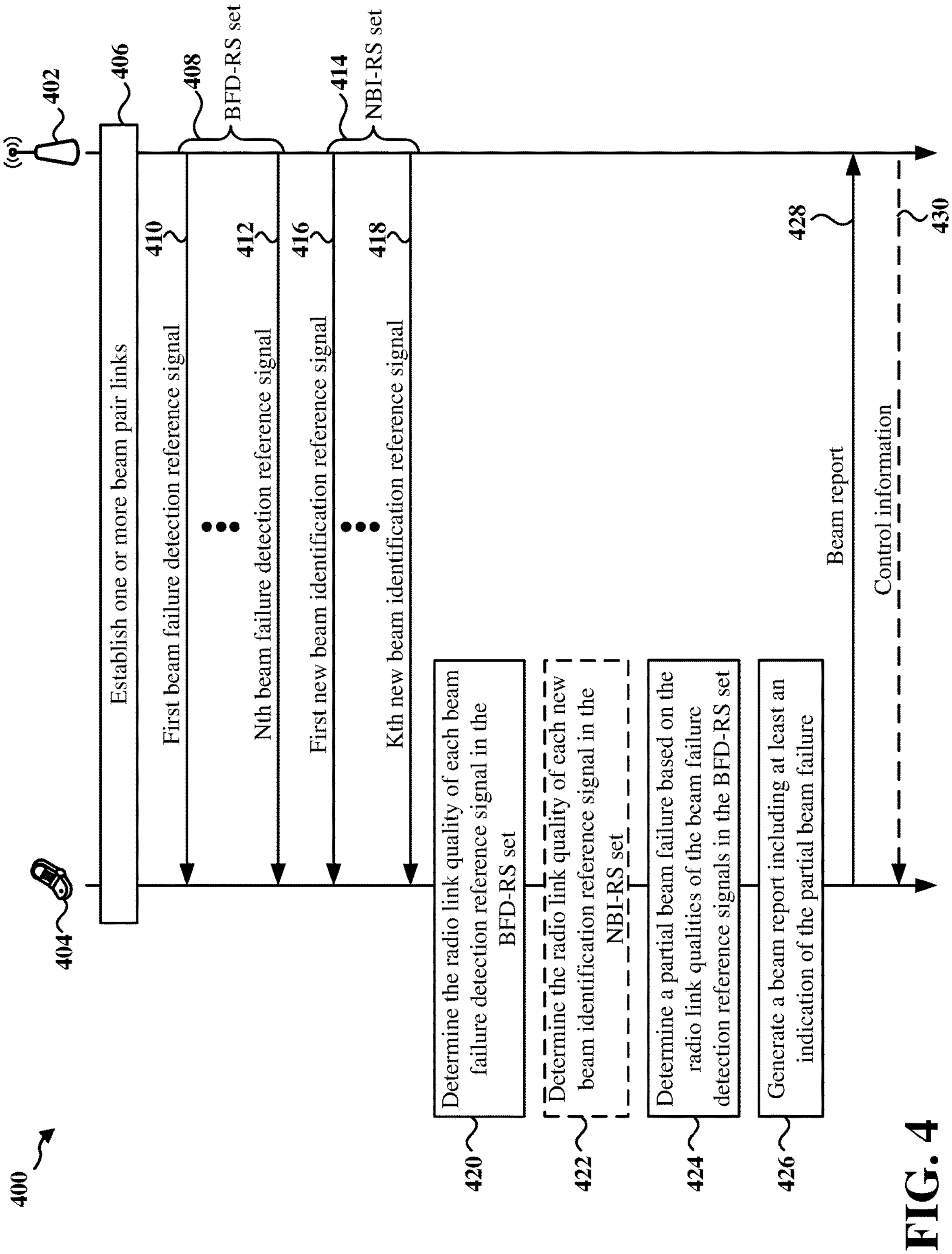
FIG. 4 illustrates a signal flow diagram in accordance with various aspects of the present disclosure.

In an aspect of the disclosure, a UE may proactively report a partial beam failure to a base station via a beam report to avoid a full BFR procedure. In some aspects of the disclosure, the UE may proactively include additional information (e.g., in addition to an indication of a partial beam failure) in the beam report. An example of a partial beam failure will now be described with reference to FIGS. 4 and 5. FIG. 4 illustrates a signal flow diagram 400 in accordance with various aspects of the present disclosure. The signal flow diagram 400 includes a base station 402 and a UE 404.

Figure 5:
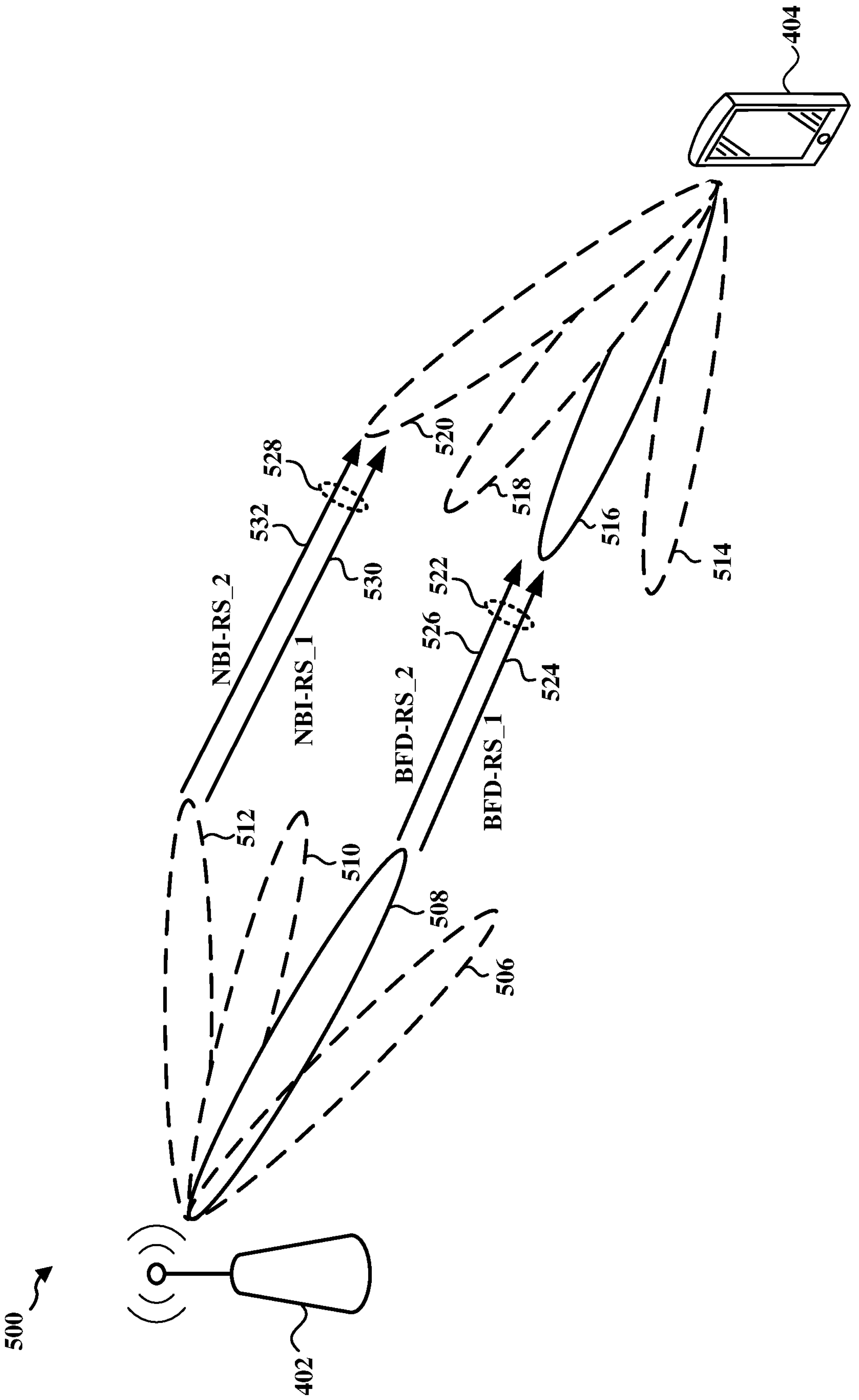
FIG. 5 illustrates an example network including the base station and the UE.

With reference to FIG. 4, at 406, the base station 402 and the UE 404 may establish one or more beam pair links. For example, FIG. 5 illustrates an example network 500 including the base station 402 and the UE 404. The base station 402 and the UE 404 may establish a beam pair link by sweeping through a number of respective beams and selecting the best beam based on beam measurements. For example, the base station 402 may sweep through the beams 506, 508, 510, and 512, and the UE 404 may sweep through the beams 514, 516, 518, and 520. In the example of FIG. 5, the base station 402 may select the beam 508 as the best beam and the UE 404 may select the beam 516 as the best beam. Therefore, the base station 402 and the UE 404 may establish a beam pair link including the beams 508, 516.

With reference to FIG. 4, the base station 402 may configure the UE 404 with a set of beam failure detection reference signals 408 (also referred to as a beam failure detection reference signal set or a BFD-RS set) for purposes of monitoring the quality of a radio link. In some examples, the set of beam failure detection reference signals 408 may include reference signals configured to be spatially quasi co-located with a PDCCH demodulation reference signal (DMRS). In some examples, the set of beam failure detection reference signals 408 may include N beam failure detection reference signals, where N represents a positive integer.

The base station 402 may transmit the set of beam failure detection reference signals 408 to the UE 404. For example, as shown in FIG. 4, the base station 402 may transmit a first beam failure detection reference signal 410 through an Nth beam failure detection reference signal 412 using a beam (e.g., the beam 508 in FIG. 5) of the beam pair link established with the UE 404. The UE 404 may receive the set of beam failure detection reference signals 408.

In some examples, the set of beam failure detection reference signals 408 may include one or more SS/PBCH blocks and/or one or more CSI-RSs. Each beam failure detection reference signal (e.g., a SS/PBCH block or a CSI-RS) may be identified by an index. For example, an SS/PBCH block may be identified by an SS/PBCH block index and a CSI-RS may be identified by a CSI-RS resource index.

In one example, the set of beam failure detection reference signals 408 may include two beam failure detection reference signals (e.g., N=2). This example is illustrated in FIG. 5. In FIG. 5, the UE 404 is configured with a set of beam failure detection reference signals 522 including a first beam failure detection reference signal (BFD-RS_1) 524 and a second beam failure detection reference signal (BFD-RS_2) 526.

With reference to FIG. 4, the base station 402 may further configure the UE 404 with a set of new beam identification reference signals 414 (also referred to as a new beam identification reference signal set or an NBI-RS set) for purposes of selecting one or more candidate beams. In some examples, the set of new beam identification reference signals 414 may include reference signals configured to be spatially quasi co-located with a PDCCH DMRS. In some examples, the set of new beam identification reference signals 414 may include K new beam identification reference signals 414, where K represents a positive integer.

The base station 402 may transmit the set of new beam identification reference signals 414 to the UE 404. For example, as shown in FIG. 4, the base station 402 may transmit a first new beam identification reference signal 416 through a Kth new beam identification reference signal 418 using a beam (e.g., the beam 512 in FIG. 5) different from a beam (e.g., the beam 508 in FIG. 5) of the beam pair link established with the UE 404. The UE 404 may receive the set of new beam identification reference signals 414.

In some examples, the set of new beam identification reference signals 414 may include one or more SS/PBCH blocks and/or one or more CSI-RSs. Each new beam identification reference signal (e.g., a SS/PBCH block or a CSI-RS) may be identified by an index. For example, an SS/PBCH block may be identified by an SS/PBCH block index and a CSI-RS may be identified by a CSI-RS resource index.

In one example, the set of new beam identification reference signals 414 may include two new beam identification reference signals (e.g., K=2). This example is illustrated in FIG. 5. In FIG. 5, the UE 404 is configured with a set of new beam identification reference signals 528 including a first new beam identification reference signal (NBI-RS_1) 530 and a second new beam identification reference signal (NBI-RS_2) 532.

With reference to FIG. 4, the BFD-RS set 408 may enable the UE 404 to assess the radio link quality of a beam (e.g., the beam 516 in FIG. 5) of the beam pair link established with the base station 402. At 420, the UE 404 may determine the radio link quality of each beam failure detection reference signal in the set of beam failure detection reference signals 408. In one example, the set of beam failure detection reference signals 408 may include two beam failure detection reference signals (e.g., N=2). In this example, with reference to FIG. 5, the UE 404 may determine the radio link quality of the first beam failure detection reference signal (BFD-RS_1) 524 and the radio link quality of the second beam failure detection reference signal (BFD-RS_2) 526. In some examples, the UE 404 may determine the radio link quality of each beam failure detection reference signal subject to a beam failure recovery timer and a beam failure recovery counter.

At 422, the UE 404 may optionally determine the radio link quality of each new beam identification reference signal in the set of new beam identification reference signals 414. In one example, the set of new beam identification reference signals 414 may include two beam failure detection reference signals (e.g., K=2). In this example, with reference to FIG. 5, the UE 404 may determine the radio link quality of the first new beam identification reference signal (NBI-RS_1) 530 and the radio link quality of the second new beam identification reference signal (NBI-RS_2) 532.

At 424, the UE 404 may determine a partial beam failure based on the radio link qualities of the beam failure detection reference signals in the set of beam failure detection reference signals 408. In some aspects of the disclosure, the UE 404 may determine a partial beam failure when a radio link quality of at least a first beam failure detection reference signal in the set of beam failure detection reference signals 408 is less than a quality threshold, and a radio link quality of at least a second beam failure detection reference signal in the set of beam failure detection reference signals 408 is greater than or equal to the quality threshold.

At 426, the UE 404 may generate a beam report 428 including at least an indication of the partial beam failure. The UE 404 may transmit the beam report 428 to the base station 402.

In some aspects of the disclosure, the beam report 428 may include a beam failure recovery medium access control (MAC) control element (CE) (also referred to as a beam failure recovery MAC-CE). The beam failure recovery MAC-CE may include at least one field for indicating whether or not a partial beam failure has occurred (also referred to as a partial beam failure indication field). In some examples, the partial beam failure indication field may be a 1-bit field and may be associated with a set of beam failure detection reference signals configured for a UE (e.g., the UE 404). For example, a first value (e.g., '1') in the partial beam failure indication field may indicate that a partial beam failure has occurred and a second value (e.g., '0') in the partial beam failure indication field may indicate that a partial beam failure has not occurred. Therefore, in some examples, the value in the partial beam failure indication field may indicate whether the radio link quality of at least a first beam failure detection reference signal (e.g., the first beam failure detection reference signal 410) in the set of beam failure detection reference signals 408 is less than the quality threshold and the radio link quality of at least a second beam failure detection reference signal (e.g., the Nth beam failure detection reference signal 412) is greater than or equal to the quality threshold.

For example, if a set of beam failure detection reference signals configured for a UE (e.g., the UE 404) includes two or more beam failure detection reference signals, the UE may determine that a partial beam failure has occurred when the radio link quality of at least a first beam failure detection reference signal in the set of beam failure detection reference signals is less than a quality threshold, and the radio link quality of at least a second beam failure detection reference signal in the set of beam failure detection reference signals is greater than or equal to the quality threshold.

If the UE determines that a partial beam failure has occurred, the UE may include a first value (e.g., '1') in the partial beam failure indication field of the beam failure recovery MAC-CE to indicate that a partial beam failure has occurred. If the UE determines that a partial beam failure has not occurred, the UE may include a second value (e.g., '0') in the partial beam failure indication field of the beam failure recovery MAC-CE to indicate that a partial beam failure has not occurred. Therefore, a value in the partial beam failure indication field of the beam failure recovery MAC-CE may indicate whether the radio link quality of at least a first beam failure detection reference signal in the set of beam failure detection reference signals is less than a quality threshold and the radio link quality of at least a second beam failure detection reference signal in the set of beam failure detection reference signals is greater than or equal to the quality threshold. An example implementation of the previously described beam failure recovery MAC-CE is described with reference to FIG. 6.

Figure 6:
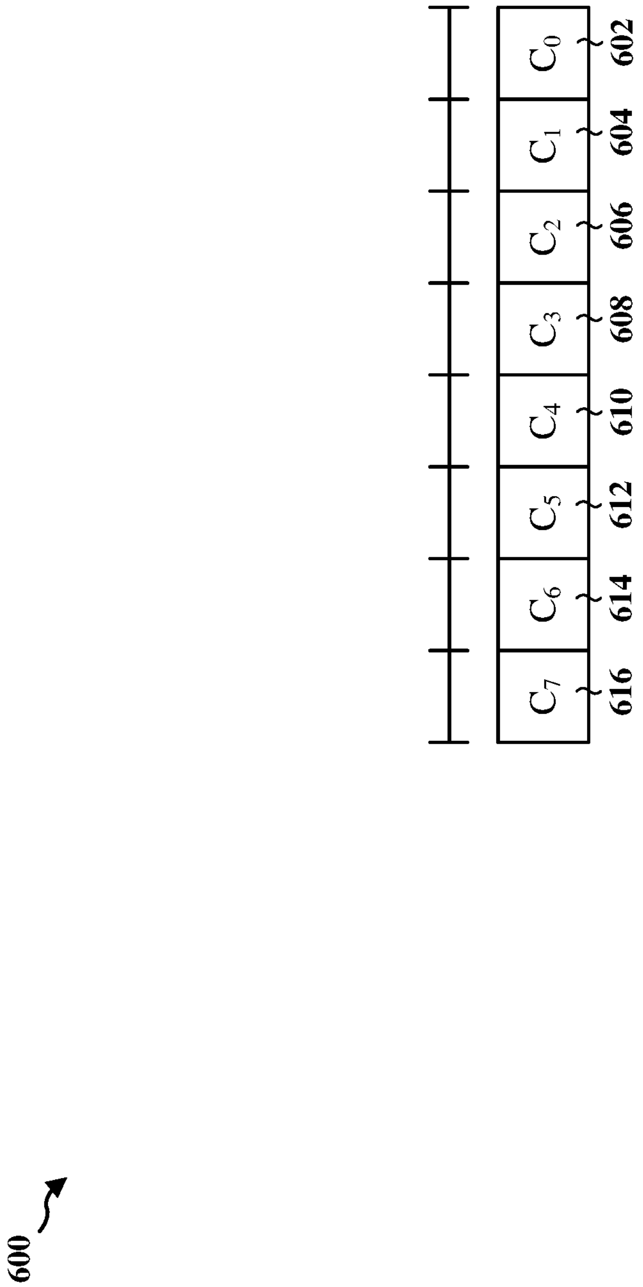
FIG. 6 is a diagram illustrating an example beam failure recovery medium access control (MAC) control element (CE) (also referred to as a beam failure recovery MAC-CE) in accordance with various aspects of the present disclosure.

FIG. 6 is a diagram illustrating an example beam failure recovery MAC-CE 600 in accordance with various aspects of the present disclosure. The beam failure recovery MAC-CE 600 includes eight 1-bit fields, where each 1-bit field is associated with a set of beam failure detection reference signals of a component carrier (e.g., a primary component carrier or a secondary component carrier). For example, the beam failure recovery MAC-CE 600 may include a first field 602, a second field 604, a third field 606, a fourth field 608, a fifth field 610, a sixth field 612, a seventh field 614, and an eighth field 616. Each of the fields 602 through 616 may be referred to as a partial beam failure indication field for a component carrier. For example, a first bit $C_0$ in the first field 602 may indicate whether or not a partial beam failure has occurred in a first set of beam failure detection reference signals for a first component carrier, a second bit $C_1$ in the second field 604 may indicate whether or not a partial beam failure has occurred in a second set of beam failure detection reference signals for a second component carrier, and so on. In some examples, each of the bits in the beam failure recovery MAC-CE 600 (e.g., each of bits $C_0$ through $C_7$) may be set to a first value (e.g., '1') to indicate that a partial beam failure has occurred or a second value (e.g., '0') to indicate that a partial beam failure has not occurred.

In some aspects of the disclosure, the beam report 428 may include an indication of a partial beam failure and may further include an index value identifying a beam failure detection reference signal that is in a failure condition. In some aspects of the disclosure, the beam report 428 may include a beam failure recovery MAC-CE including at least one field for indicating whether or not a partial beam failure has occurred (also referred to as a partial beam failure indication field) and at least one field for indicating an index value identifying a beam failure detection reference signal that is in a failure condition.

In some examples, the partial beam failure indication field may be a 1-bit field and may be associated with a set of beam failure detection reference signals configured for a UE (e.g., the UE 404) as described herein. In some examples, if the set of beam failure detection reference signals configured for the UE includes two beam failure determination reference signals (e.g., the set of beam failure detection reference signals 522 including a first beam failure detection reference signal (e.g., BFD-RS_1) 524 and a second beam failure detection reference signal (e.g., BFD-RS_2) 526 configured for the UE 404), the field for indicating an index value identifying a beam failure detection reference signal that is in a failure condition may be a 1-bit field. In these examples, the index value may be a 1-bit value.

For example, the index value identifying a beam failure detection reference signal in a failure condition may be a first value (e.g., '0') to indicate a first beam failure detection reference signal (e.g., BFD-RS_1 524 in FIG. 5) in the set of beam failure detection reference signals or a second value (e.g., '1') to indicate a second beam failure detection reference signal (e.g., BFD-RS_2 526 in FIG. 5) in the set of beam failure detection reference signals. An example implementation of the previously described beam failure recovery MAC-CE including at least one partial beam failure indication field and at least one field for indicating an index value identifying a beam failure detection reference signal in a failure condition is described with reference to FIG. 7.

Figure 7:
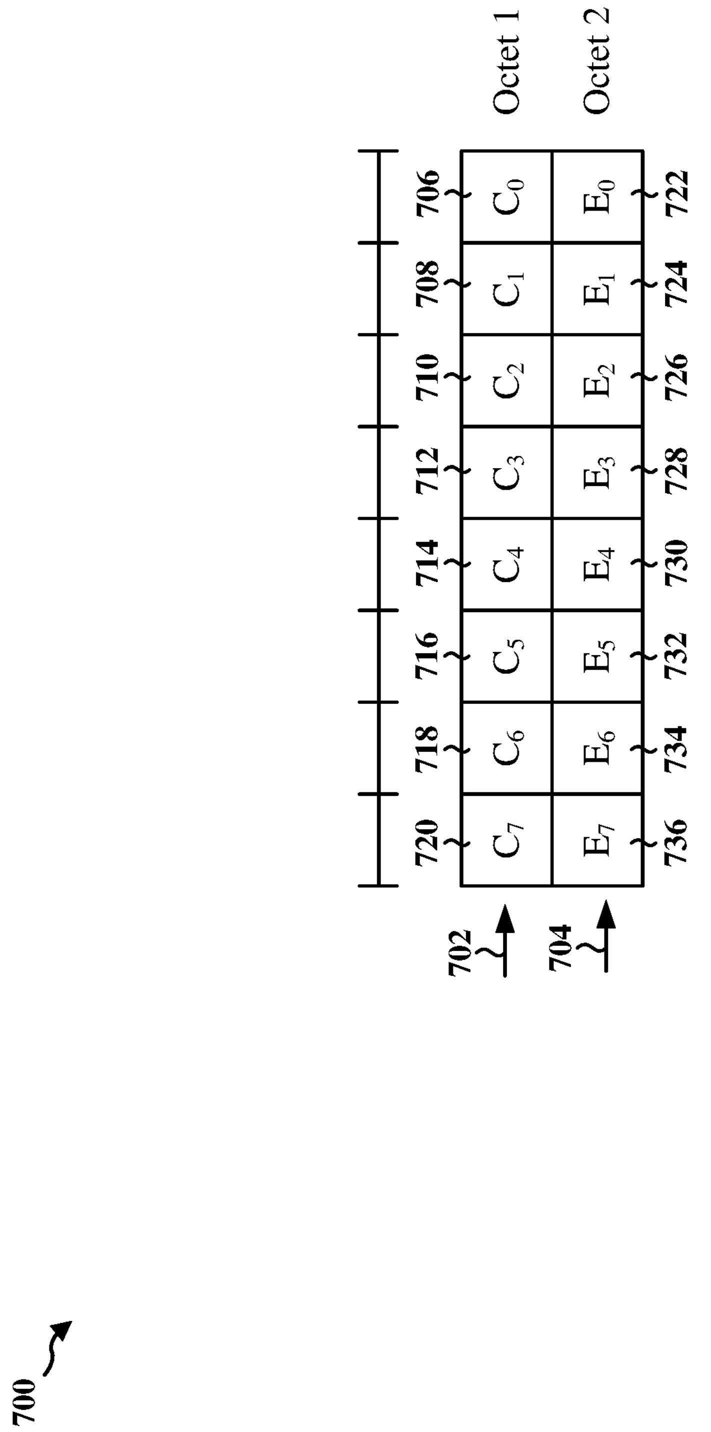
FIG. 7 is a diagram illustrating an example beam failure recovery MAC-CE in accordance with various aspects of the present disclosure.

FIG. 7 is a diagram illustrating an example beam failure recovery MAC-CE 700 in accordance with various aspects of the present disclosure. The beam failure recovery MAC-CE 700 includes a first octet 702 (also referred to as octet 1) and a second octet 704 (also referred to as octet 2). The first octet 702 includes eight 1-bit fields, where each 1-bit field is associated with a set of beam failure detection reference signals of a component carrier (e.g., a primary component carrier or a secondary component carrier). For example, the first octet 702 of the beam failure recovery MAC-CE 700 may include a first field 706, a second field 708, a third field 710, a fourth field 712, a fifth field 714, a sixth field 716, a seventh field 718, and an eighth field 720. Each of the fields 706 through 720 may be referred to as a partial beam failure indication field. Therefore, in some examples, each of the fields 706 through 720 may be used to indicate whether the radio link quality of at least a first beam failure detection reference signal in a set of beam failure detection reference signals is less than a quality threshold and the radio link quality of at least a second beam failure detection reference signal in the set of beam failure detection reference signals is greater than or equal to the quality threshold.

For example, a first bit $C_0$ in the first field 706 may indicate whether or not a partial beam failure has occurred in a first set of beam failure detection reference signals for a first component carrier, a second bit $C_1$ in the second field 708 may indicate whether or not a partial beam failure has occurred in a second set of beam failure detection reference signals for a second component carrier, and so on. In some examples, each of the bits in the beam failure recovery MAC-CE 700 (e.g., each of bits $C_0$ through $C_7$) may be set to a first value (e.g., '1') to indicate that a partial beam failure has occurred or a second value (e.g., '0') to indicate that a partial beam failure has not occurred.

The second octet 704 includes eight 1-bit fields, where each 1-bit field is associated with a set of beam failure detection reference signals of a component carrier. For example, the second octet of the beam failure recovery MAC-CE 700 may include a first field 722, a second field 724, a third field 726, a fourth field 728, a fifth field 730, a sixth field 732, a seventh field 734, and an eighth field 736.

In some examples, each 1-bit field in the second octet 704 may include an index value identifying a beam failure detection reference signal determined to be in a failure condition. In one example, if a set of beam failure detection reference signals for a first component carrier includes two beam failure determination reference signals (e.g., BFD-RS_1 524 and BFD-RS_2 526 in FIG. 5), the first bit $E_0$ in the first field 722 may be set to a first value (e.g., '0') to indicate that the first beam failure detection reference signal (e.g., BFD-RS_1 524) in the set of beam failure detection reference signals for the first component carrier is in a failure condition, or may be set to a second value (e.g., '1') to indicate that the second beam failure detection reference signal (e.g., BFD-RS_2 526) in the set of beam failure detection reference signals for the first component carrier is in a failure condition. Therefore, in some examples, the remaining bits $E_1$ through $E_7$ in the fields 724 through 736 may include an index value identifying a beam failure detection reference signal in a failure condition as previously described for different sets of beam failure detection reference signals of different component carriers.

In some aspects of the disclosure, the beam report 428 may include an indication of a partial beam failure, an index value identifying a beam failure detection reference signal in a failure condition, and an index value identifying a new beam identification reference signal in a set of new beam identification reference signals when a radio link quality of the new beam identification reference signal exceeds the radio link quality of at least one of the beam failure detection reference signals (e.g., at least one of the beam failure detection reference signals in the set of beam failure detection reference signals 408) by an amount greater than or equal to a difference threshold.

In some aspects of the disclosure, a beam report (e.g., the beam report 428) may include an index value identifying a new beam identification reference signal in a set of new beam identification reference signals (e.g., the set of new beam identification reference signals 414) when a radio link quality of the new beam identification reference signal exceeds a radio link quality of a beam failure detection reference signal in a failure condition and/or a radio link quality of a different beam failure detection reference signal by an amount greater than or equal to a difference threshold. In some aspects of the disclosure, the beam report further includes an index value that identifies a beam failure detection reference signal (e.g., a beam failure detection reference signal in a failure condition or a different beam failure detection reference signal not in a failure condition) when the radio link quality of the new beam identification reference signal exceeds the radio link quality of the beam failure detection reference signal by an amount greater than or equal to a difference threshold.

For example, the difference threshold may be a number representing a radio link quality (e.g., a BLER value, a reference signal received power (RSRP) value, or other appropriate value). Therefore, as the difference threshold is increased (e.g., set to larger values), a new beam identification reference signal may need to have an increasingly higher radio link quality relative to a beam failure detection reference signal in a failure condition for identification as a possible candidate. In some examples, the base station (e.g., the base station 402) may provide a value of the difference threshold to the UE (e.g., the UE 404).

For example, with reference to FIG. 4, if a beam failure detection reference signal (e.g., the Nth beam failure detection reference signal 412) in the set of beam failure detection reference signals 408 is in a failure condition and the radio link quality of a new beam identification reference signal (e.g., the Kth new beam identification reference signal 418) in the set of new beam identification reference signals 414 exceeds the radio link quality of the beam failure detection reference signal in the set of beam failure detection reference signals 408 by an amount greater than or equal to a difference threshold, the beam report 428 may include an index value identifying that new beam identification reference signal.

For example, with reference to FIG. 4, if the first beam failure detection reference signal 410 is in a failure condition and the first new beam identification reference signal 416 has a radio link quality that exceeds the radio link quality of the first beam failure detection reference signal 410 by an amount greater than or equal to the difference threshold, the beam report 428 may include an index value identifying the first new beam identification reference signal 416.

In some aspects of the disclosure, the beam report 428 may include a beam failure recovery MAC-CE including at least one field for indicating whether or not a partial beam failure has occurred (also referred to as a partial beam failure indication field), at least one field for indicating an index value identifying a beam failure detection reference signal in a failure condition, and at least one field for indicating an index value identifying a new beam identification reference signal having a radio link quality that exceeds the radio link quality of the beam failure detection reference signal in a failure condition.

In some examples, the partial beam failure indication field may be a 1-bit field and may be associated with a set of beam failure detection reference signals configured for a UE (e.g., the UE 404) as described herein. In some examples, the field for indicating an index value identifying a beam failure detection reference signal in a failure condition may be a 1-bit field as described herein. In some examples, the field for indicating an index value identifying the new beam identification reference signal may be a 6-bit field.

In one example, if the set of new beam identification reference signals configured for the UE (e.g., the UE 404)

includes two new beam identification reference signals (e.g., NBI-RS_1 530 and NBI-RS_2 532 in FIG. 5), the index value may be a 1-bit value. In this example, the index value may be set to a first value (e.g., '0') to indicate a first new beam identification reference signal (e.g., NBI-RS_1 530) in the set of new beam identification reference signals or a second value (e.g., '1') to indicate a second new beam identification reference signal (e.g., NBI-RS_2 532) in the set of new beam identification reference signals. An example implementation of the previously described beam failure recovery MAC-CE including at least one field for indicating whether or not a partial beam failure has occurred, at least one field for indicating an index value identifying a beam failure detection reference signal in a failure condition, and at least one field for indicating an index value identifying a new beam identification reference signal having a radio link quality that exceeds the radio link quality of the beam failure detection reference signal in a failure condition is described with reference to FIG. 8.

Figure 8:
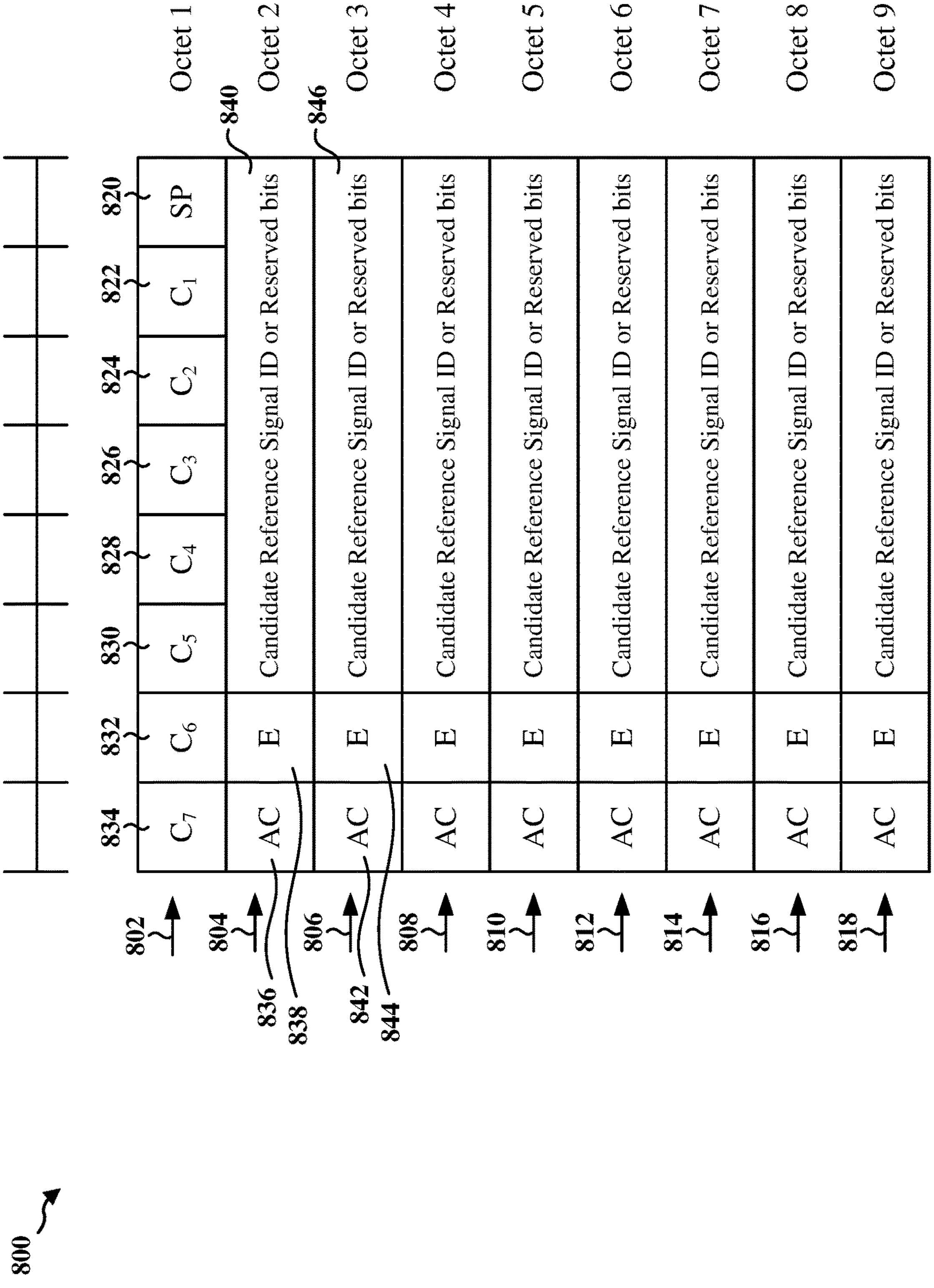
FIG. 8 is a diagram illustrating an example beam failure recovery MAC-CE in accordance with various aspects of the present disclosure.

FIG. 8 is a diagram illustrating an example beam failure recovery MAC-CE 800 in accordance with various aspects of the present disclosure. The beam failure recovery MAC-CE 800 includes up to nine octets, such as a first octet 802 (also referred to as octet 1), a second octet 804 (also referred to as octet 2), a third octet 806 (also referred to as octet 3), a fourth octet 808 (also referred to as octet 4), a fifth octet 810 (also referred to as octet 5), a sixth octet 812 (also referred to as octet 6), a seventh octet 814 (also referred to as octet 7), an eighth octet 816 (also referred to as octet 8), and a ninth octet 818 (also referred to as octet 9).

The first octet 802 includes eight 1-bit fields (e.g., first field 820, second field 822, third field 824, fourth field 826, fifth field 828, sixth field 830, seventh field 832, eighth field 834), where the first field 820 is for indicating whether or not a partial beam failure has occurred in a set of beam failure detection reference signals of a primary component carrier, and the remaining fields in the first octet 802 (e.g., the second field 822 through the eighth field 834) are for indicating whether a partial beam failure has occurred in a set of beam failure detection reference signals of a respective secondary component carrier.

A primary component carrier may be served by an SpCell and a secondary component carrier may be served by a secondary cell. An SpCell may refer to a PCell of a master cell group (MCG) or the PSCell of a secondary cell group (SCG). In some examples, a bit SP in the first field 820 may be set to a first value (e.g., '1') to indicate that a partial beam failure has occurred in a set of beam failure detection reference signals of a primary component carrier or may be set to a second value (e.g., '0') to indicate that a partial beam failure has not occurred in the set of beam failure detection reference signals of the primary component carrier.

In some examples, each of the remaining fields in the first octet 802 (e.g., the second field 822 through the eighth field 834) is associated with a set of beam failure detection reference signals of a different secondary component carrier. For example, a bit $C_1$ in the second field 822 may indicate whether or not a partial beam failure has occurred in a first set of beam failure detection reference signals of a first secondary component carrier, a bit $C_2$ in the third field 824 may indicate whether or not a partial beam failure has occurred in a second set of beam failure detection reference signals of a second secondary component carrier, a bit $C_3$ in the fourth field 826 may indicate whether or not a partial beam failure has occurred in a third set of beam failure detection reference signals of a third secondary component carrier, and so on.

In some examples, each of the bits in the fields 822 through 834 (e.g., each of bits $C_1$ through $C_7$) in the beam failure recovery MAC-CE 800 may be set to a first value (e.g., '1') to indicate that a partial beam failure has occurred or a second value (e.g., '0') to indicate that a partial beam failure has not occurred. Therefore, in some examples, each of the fields 822 through 834 may be used to indicate whether the radio link quality of at least a first beam failure detection reference signal in a set of beam failure detection reference signals is less than a quality threshold and the radio link quality of at least a second beam failure detection reference signal in the set of beam failure detection reference signals is greater than or equal to the quality threshold.

In some examples, each of the remaining eight octets (e.g., the second octet 804 through the ninth octet 818) in the MAC-CE 800 may be associated with a respective field in the first octet 802. For example, the second octet 804 may be associated with the first field 820 in the first octet 802 if a partial beam failure has occurred, the third octet 806 may be associated with the second field 822 in the first octet 802 if a partial beam failure has occurred, the fourth octet 808 may be associated with the third field 824 in the first octet 802 if a partial beam failure has occurred, and so on. Finally, the ninth octet 818 may be associated with the eighth field 834 in the first octet 802 if a partial beam failure has occurred.

In some examples, each of the second through ninth octets (e.g., the second octet 804 through the ninth octet 818) in the MAC-CE 800 may include a first field, such as the first field 836, for indicating whether the octet includes information (e.g., an index value) identifying a new beam identification reference signal. For example, the new beam identification reference signal may be from a set of new beam identification reference signals and may have a radio link quality that exceeds a radio link quality of a beam failure detection reference signal in a failure condition. In some examples, a bit AC in the first field 836 in the second octet may be set to a first value (e.g., '1') to indicate that the octet includes information (e.g., an index value) identifying a new beam identification reference signal, or may be set to a second value (e.g., '0') to indicate that the octet does not include information identifying a new beam identification reference signal.

In some examples, each of the second through ninth octets (e.g., the second octet 804 through the ninth octet 818) in the MAC-CE 800 may further include a second field, such as the second field 838. In some examples, the second field (e.g., the second field 838) may be used for indicating an index value identifying a beam failure detection reference signal in a failure condition. In one example, the set of beam failure detection reference signals for the first component carrier may include two beam failure determination reference signals (e.g., BFD-RS_1 524 and BFD-RS_2 526 in FIG. 5), and the second field 838 may be a 1-bit field. In this example, the bit E in the second field 838 may be set to a first value (e.g., '0') to indicate that the first beam failure detection reference signal (e.g., BFD-RS_1 524) in the set of beam failure detection reference signals for a secondary component carrier is in a failure condition or may be set to a second value (e.g., '1') to indicate that the second beam failure detection reference signal (e.g., BFD-RS_2 526) in the set of beam failure detection reference signals for the secondary component carrier is in a failure condition.

In other examples, the second field (e.g., the second field 838, 844) in each of the second through ninth octets (e.g., the second octet 804 through the ninth octet 818) in the MAC-CE 800 may be used for indicating an index value identifying a beam failure detection reference signal when the radio link quality of a new beam identification reference signal exceeds the radio link quality of the beam failure detection reference signal. In these examples, the beam failure detection reference signal identified in the second field (e.g., the second field 838, 844) may or may not be in a failure condition. In some examples, the radio link quality of the new beam identification reference signal exceeds the radio link quality of the beam failure detection reference signal identified in the second field by an amount greater than or equal to the difference threshold.

In some examples, each of the second through ninth octets (e.g., the second octet 804 through the ninth octet 818) in the MAC-CE 800 may further include a third field, such as the third field 840, for information (e.g., an index value) identifying a new beam identification reference signal having a radio link quality that exceeds the radio link quality of the beam failure detection reference signal indicated in the second field (e.g., the second field 838). In some aspects, the radio link quality of the new beam identification reference signal may exceed the radio link quality of the beam failure detection reference signal indicated in the second field by an amount greater than or equal to a difference threshold. Therefore, in some examples, the third field (e.g., the third field 840) of the second through ninth octets in the MAC-CE 800 may be used to identify a new beam identification reference signal when the radio link quality of the new beam identification reference signal exceeds at least one of the radio link quality of a beam failure detection reference signal in a failure condition or the radio link quality of a different beam failure detection reference signal that is not in a failure condition by an amount greater than or equal to the difference threshold.

The new beam identification reference signal identified in the third field 840 may be referred to as a candidate reference signal (also referred to as a candidate RS). In some examples, the third field 840 may be a 6-bit field. If no new beam identification reference signal has been determined (e.g., the first field 836 is set to a value indicating that the octet does not include information identifying a new beam identification reference signal), the six bits of the third field 840 may be considered to be reserved bits and may be ignored by a base station (e.g., the base station 402).

An example implementation of the beam failure recovery MAC-CE 800 will now be described. In one example scenario, the UE 404 may be configured with a set of beam failure detection reference signals 522 of a first secondary component carrier, where the set of beam failure detection reference signals 522 includes the first beam failure detection reference signal (BFD-RS_1) 524 and the second beam failure detection reference signal (BFD-RS_2) 526. The UE 404 may determine that the radio link quality of the first beam failure detection reference signal (BFD-RS_1) 524 exceeds a quality threshold and further determines that the radio link quality of the second beam failure detection reference signal (BFD-RS_2) 526 is below the quality threshold. Since the first beam failure detection reference signal (BFD-RS_1) 524 is not considered to be in a failure condition and the second beam failure detection reference signal (BFD-RS_2) 522 is considered to be in a failure condition, the UE 404 may determine that a partial beam failure has occurred.

Continuing with this example scenario, the UE 404 may further determine that the radio link quality of the new beam identification reference signal NBI-RS_2 532 exceeds the radio link quality of the second beam failure detection reference signal (BFD-RS_2) 526 in a failure condition by an amount that is greater than or equal to a difference threshold. The UE 404 may proactively generate the MAC-CE 800 in FIG. 8 and may set the bit $C_1$ in the second field 822 associated with the first secondary component carrier to a first value (e.g., '1') to indicate that a partial beam failure has occurred in the set of beam failure detection reference signals 522 of the first secondary component carrier.

The UE 404 may set the bit AC in the first field 842 of the third octet 806 to a first value (e.g., '1') to indicate that the octet includes information (e.g., an index value) identifying a new beam identification reference signal. The UE 404 may set the bit E in the second field 844 to an index value (e.g., '1') identifying BFD-RS_2 526 (e.g., the beam failure detection reference signal in a failure condition). The UE 404 may include an index value identifying the new beam identification reference signal NBI-RS_2 532 in the third field 846.

In some aspects of the disclosure, the UE 404 may generate and transmit the beam report 428 when a beam failure detection reference signal in the set of beam failure detection reference signals 408 is in a failure condition and the radio link quality of a new beam identification reference signal in the set of new beam identification reference signals 414 exceeds each radio link quality of each beam failure detection reference signal in the set of beam failure detection reference signals 408 by an amount greater than or equal to a difference threshold. In these aspects, the beam report 428 may include an index value identifying that new beam identification reference signal. In some examples, the beam report 428 may include the previously described beam failure recovery MAC-CE 800 shown in FIG. 8.

In one example, if the first beam failure detection reference signal 410 in the set of beam failure detection reference signals 408 is in a failure condition and a radio link quality of the Kth new beam identification reference signal 418 exceeds the radio link qualities of all the beam failure detection reference signals (e.g., the first beam failure detection reference signal 410 through the Nth beam failure detection reference signal 412) in the set of beam failure detection reference signals 408, the beam report 428 may include an index value identifying the Kth new beam identification reference signal 418.

In some aspects of the disclosure, detection of a partial beam failure at the UE 404 may trigger the UE 404 to proactively generate a beam report that includes at least an indication of the partial beam failure and to transmit the beam report to the base station 402. For example, at 426, the UE 404 may generate a beam report 428 including at least an indication of the partial beam failure. The UE 404 may transmit the beam report 428 to the base station 402.

In some aspects of the disclosure, the base station 402 may optionally transmit control information 430 to the UE 404 in response to the beam report 428. In some aspects of the disclosure, an indication (e.g., in the beam report 428) that a partial beam failure has occurred may trigger the base station 402 to transmit a CSI report request. In these aspects, for example, the control information 430 from the base station 402 may include a request for a CSI report. In some examples, a CSI report from the UE 404 may enable the base station 402 to obtain information for purposes of determining whether a beam adjustment may be performed to avoid a full beam recovery procedure.

If the beam report 428 includes an indication that a partial beam failure has occurred and includes an index value identifying a beam failure detection reference signal that is in a failure condition, the base station 402 may transmit a CSI report request in response to the beam report 428. For example, the control information 430 from the base station 402 may include a request for a CSI report. The base station 402 may receive a CSI report from the UE 404 and may use the information in the CSI report to update the PDCCH beam associated with the beam failure detection reference signal that is in a failure condition.

If the beam report 428 includes an indication that a partial beam failure has occurred, an index value identifying a beam failure detection reference signal that is in a failure condition, and an index value identifying a new beam identification reference signal (e.g., a new beam identification reference signal having a radio link quality that exceeds the radio link quality of the beam failure detection reference signal in a failure condition by an amount greater than or equal to a difference threshold), the base station 402 may transmit a CSI report request in response to the beam report 428. For example, the control information 430 from the base station 402 may include a request for a CSI report. The base station 402 may receive a CSI report from the UE 404 and may use the information in the CSI report along with the index value identifying the new beam identification reference signal to update the PDCCH beam associated with the beam failure detection reference signal that is in a failure condition. For example, the base station 402 may update the PDDCH beam based on a beam associated with the new beam identification reference signal.

In some aspects of the present disclosure, the UE 404 may transmit the beam report 428 on the PUSCH when the PUSCH is allocated to the UE 404 in a serving cell. In some examples, the beam report 428 may be a beam failure recovery MAC-CE containing at least an indication of a partial beam failure, such as the beam failure recovery MAC-CE 600, 700, 800 described herein. The UE 404 may transmit the beam failure recovery MAC-CE on the PUSCH when the base station 402 has allocated resources on the PUSCH to the UE 404.

In some examples, the UE 404 may transmit the beam failure recovery MAC-CE (e.g., the beam failure recovery MAC-CE 600, 700, 800) without any limits as to the size of the beam failure recovery MAC-CE. In some examples, if a UL grant from the base station 402 allocates a number of resources to the UE 404 for transmission of a payload on the PUSCH, and the number of allocated resources is equal to the size of the payload, the UE 404 may still transmit the beam failure recovery MAC-CE (e.g., the beam failure recovery MAC-CE 600, 700, 800) on the PUSCH. In this example, the beam failure recovery MAC-CE may be considered to be a part of the payload. Therefore, in some scenarios, if the UE 404 is allocated resources on the PUSCH for transmission of a payload and the number of padding bits (also referred to as zero padding bits) on the PUSCH is less than the size of the beam failure recovery MAC-CE, the UE 404 may still transmit the beam failure recovery MAC-CE with the payload.

In some aspects of the disclosure, the UE 404 may use a scheduling request PUCCH resource (e.g., SR-PUCCH-resourceindex) or a beam failure recovery PUCCH (BFR-PUCCH) resource to request a UL grant for transmission of the beam failure recovery MAC-CE (e.g., the beam failure recovery MAC-CE 600, 700, 800) when the UE 404 has not been allocated resources on the PUSCH. In some aspects of the disclosure, the UE 404 may be not allowed to request a UL grant when the UE 404 has not been allocated any resources on the PUSCH.

In some aspects of the disclosure, the UE 404 may transmit the beam failure recovery MAC-CE (e.g., the beam failure recovery MAC-CE 600, 700, 800) on the PUSCH when resources on the PUSCH have been allocated and the number of padding bits for the PUSCH is equal to or larger than the total size of the beam failure recovery MAC-CE and the subheader of the beam failure recovery MAC-CE (e.g., the total number of bits of the beam failure recovery MAC-CE and the subheader of the beam failure recovery MAC-CE). In these aspects, transmission of the beam failure recovery MAC-CE may not increase UL overhead since the beam failure recovery MAC-CE effectively replaces the padding bits. The beam failure recovery MAC-CE described herein may be referred to as a padding beam failure recovery MAC-CE.

In some aspects of the disclosure, the beam failure recovery MAC-CE described herein (e.g., the beam failure recovery MAC-CE 600, 700, 800) may have a new logical channel ID different from any existing MAC-CEs associated with a beam failure recovery.

In some examples, if a UE (e.g., the UE 404) determines that all beam failure detection reference signals in a BFD-RS set are in a failure condition, the UE may still be able to revert to a legacy (e.g., conventional) beam failure recovery procedure. Therefore, the aspects described herein may enhance the functionality of UEs with partial beam failure detection and reporting features, while maintaining the availability of legacy beam failure recovery procedures.

Figure 9:
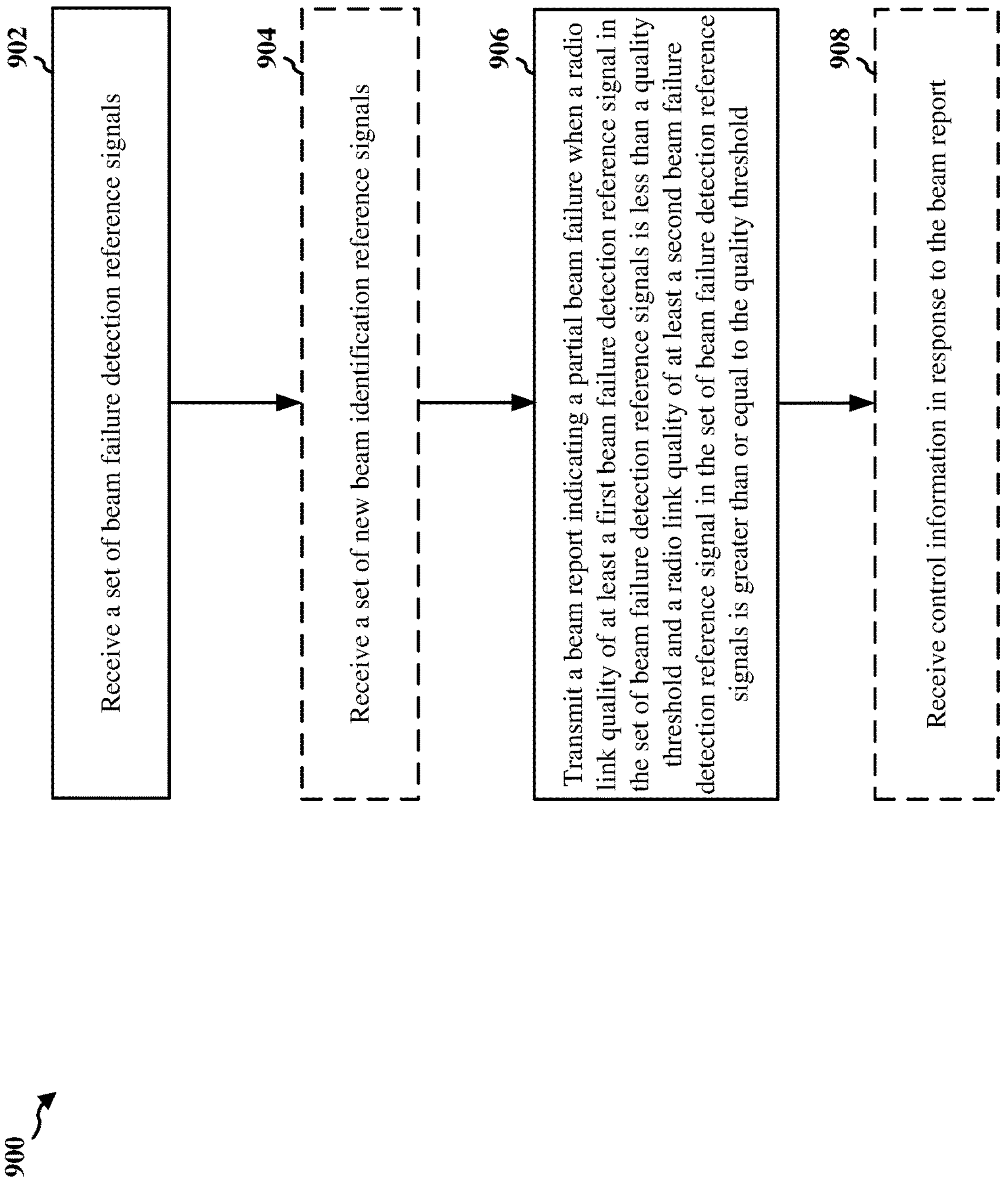
FIG. 9 is a flowchart of a method of wireless communication.

FIG. 9 is a flowchart 900 of a method of wireless communication. The method may be performed by a UE (e.g., the UE 404; the apparatus 1002/1002'; the processing system 1114, which may include the memory 360 and which may be the entire UE 404 or a component of the UE 404, such as the TX processor 368, the RX processor 356, and/or the controller/processor 359). In FIG. 9, blocks indicated with dashed lines represent optional blocks.

At 902, the UE receives a set of beam failure detection reference signals. In some examples, the set of beam failure detection reference signals may include one or more SS/PBCH blocks and/or one or more CSI-RSs. For example, with reference to FIG. 4, the base station 402 may configure the UE 404 with a set of beam failure detection reference signals 408. In some examples, the set of beam failure detection reference signals 408 may include N beam failure detection reference signals, where N represents a positive integer. The base station 402 may transmit the set of beam failure detection reference signals 408 to the UE 404. For example, as shown in FIG. 4, the base station 402 may transmit a first beam failure detection reference signal 410 through an Nth beam failure detection reference signal 412 using a beam (e.g., the beam 508 in FIG. 5) of the beam pair link established with the UE 404. The UE 404 may receive the set of beam failure detection reference signals 408.

At 904, the UE optionally receives a set of new beam identification reference signals. In some examples, the set of new beam identification reference signals may include one or more SS/PBCH blocks and/or one or more CSI-RSs. For example, with reference to FIG. 4, the base station 402 may configure the UE 404 with a set of new beam identification reference signals 414. In some examples, the set of new beam identification reference signals 414 may include K new beam identification reference signals 414, where K represents a positive integer. The base station 402 may transmit the set of new beam identification reference signals 414 to the UE 404. For example, as shown in FIG. 4, the base station 402 may transmit a first new beam identification reference signal 416 through a Kth new beam identification reference signal 418 using a beam (e.g., the beam 512 in FIG. 5) different from a beam (e.g., the beam 508 in FIG. 5)

of the beam pair link established with the UE 404. The UE 404 may receive the set of new beam identification reference signals 414.

At 906, the UE transmits a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

For example, with reference to FIG. 4, at 426, the UE 404 may generate a beam report 428 including at least an indication of the partial beam failure. The UE 404 may transmit the beam report 428 to the base station 402. In some aspects of the disclosure, the beam report 428 may include a beam failure recovery MAC-CE, such as the beam failure recovery MAC-CE 600, the beam failure recovery MAC-CE 700, or the beam failure recovery MAC-CE 800 described herein. The beam failure recovery MAC-CE may include at least one field for indicating whether or not a partial beam failure has occurred (also referred to as a partial beam failure indication field).

Finally, at 908, the UE optionally receives control information in response to the beam report. For example, with reference to FIG. 4, the UE 404 may receive the control information 430 from the base station 402 in response to the beam report 428.

In some examples, an indication (e.g., in the beam report 428) that a partial beam failure has occurred may trigger the base station 402 to transmit a CSI report request. In these aspects, for example, the control information 430 from the base station 402 may include a request for a CSI report. In some examples, a CSI report from the UE 404 may enable the base station 402 to obtain information for purposes of determining whether a beam adjustment may be performed to avoid a full beam recovery procedure.

Figure 10:
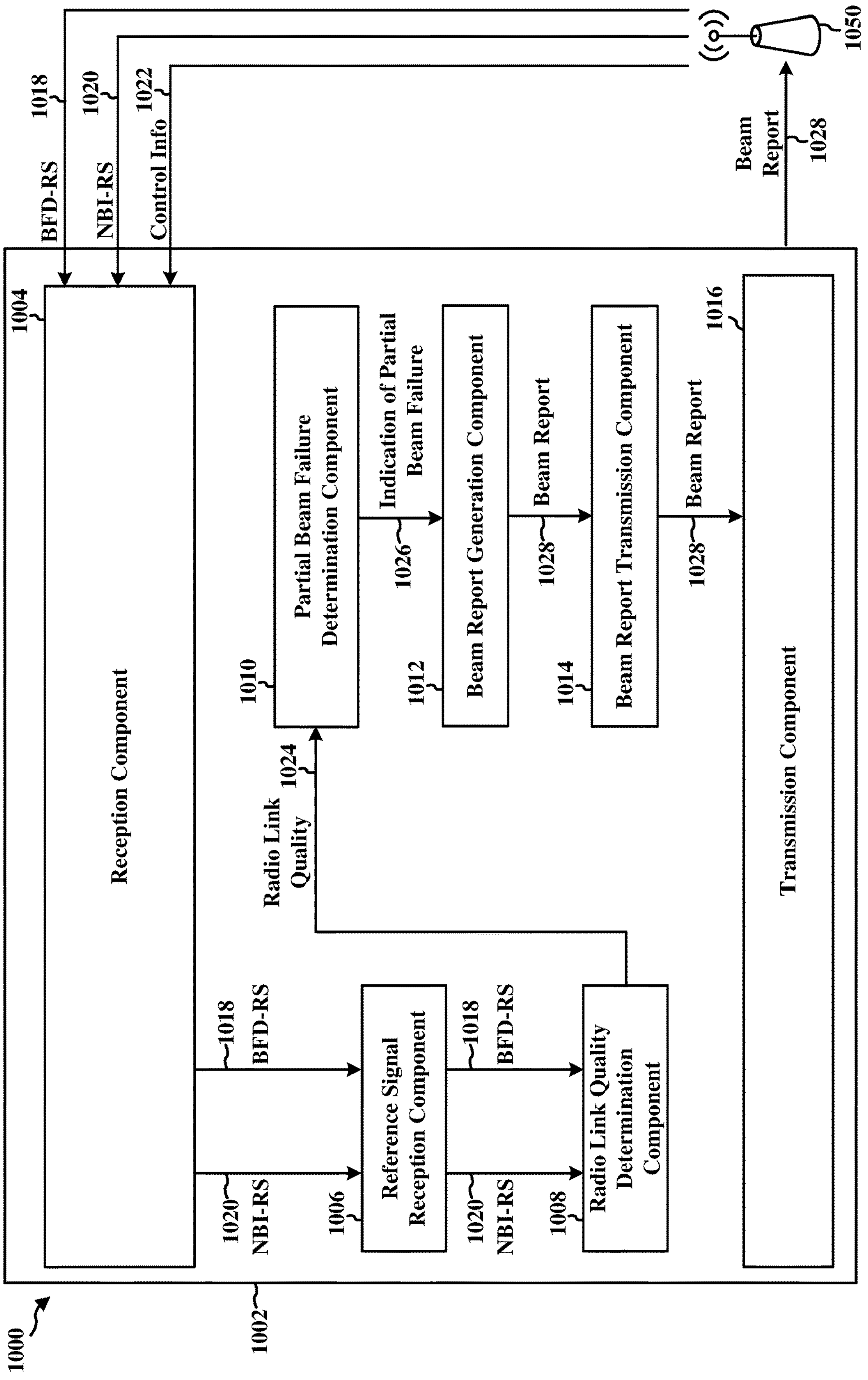
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE. The apparatus includes a reception component 1004 that receives downlink signals from a base station (e.g., the base station 1050). For example, the downlink signals may include a set of beam failure detection reference signals (e.g., one or more beam failure detection reference signals, such as the BFD-RS 1018), a set of new beam identification reference signals (e.g., one or more new beam identification reference signals, such as the NBI-RS 1020), and/or a signal containing control information 1022.

The apparatus further includes a reference signal reception component 1006 that receives (e.g., via the reception component 1004) a set of beam failure detection reference signals and/or a set of new beam identification reference signals. For example, the reference signal reception component 1006 may receive the BFD-RS 1018 and/or the NBI-RS 1020.

The apparatus further includes a radio link quality determination component 1008 that determines the radio link quality of each beam failure detection reference signal in the set of beam failure detection reference signals and/or the radio link quality of each new beam identification reference signal in the set of new beam identification reference signals. For example, the radio link quality determination component 1008 may determine the radio link quality of the BFD-RS 1018 and/or the NBI-RS 1020.

The apparatus further includes a partial beam failure determination component 1010 that determines a partial beam failure based on the radio link qualities of the beam failure detection reference signals in the set of beam failure detection reference signals. For example, the partial beam failure determination component 1010 may receive the radio link qualities of the beam failure detection reference signals in the set of beam failure detection reference signals via the signal 1024. In some examples, the partial beam failure determination component 1010 determines a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold. For example, the partial beam failure determination component 1010 may provide an indication 1026 of the partial beam failure.

The apparatus further includes a beam report generation component 1012 that generates a beam report 1028 including at least an indication of the partial beam failure (e.g., the indication 1026 of the partial beam failure). The beam report 1028 may correspond to the beam report described herein (e.g., the beam report 428 in FIG. 4).

The apparatus further includes a beam report transmission component 1014 that transmits the beam report 1028 (e.g., via the transmission component 1016).

The apparatus further includes a transmission component 1016 that transmits uplink signals to a base station (e.g., the base station 1050). For example, the uplink signals may include the beam report 1028.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
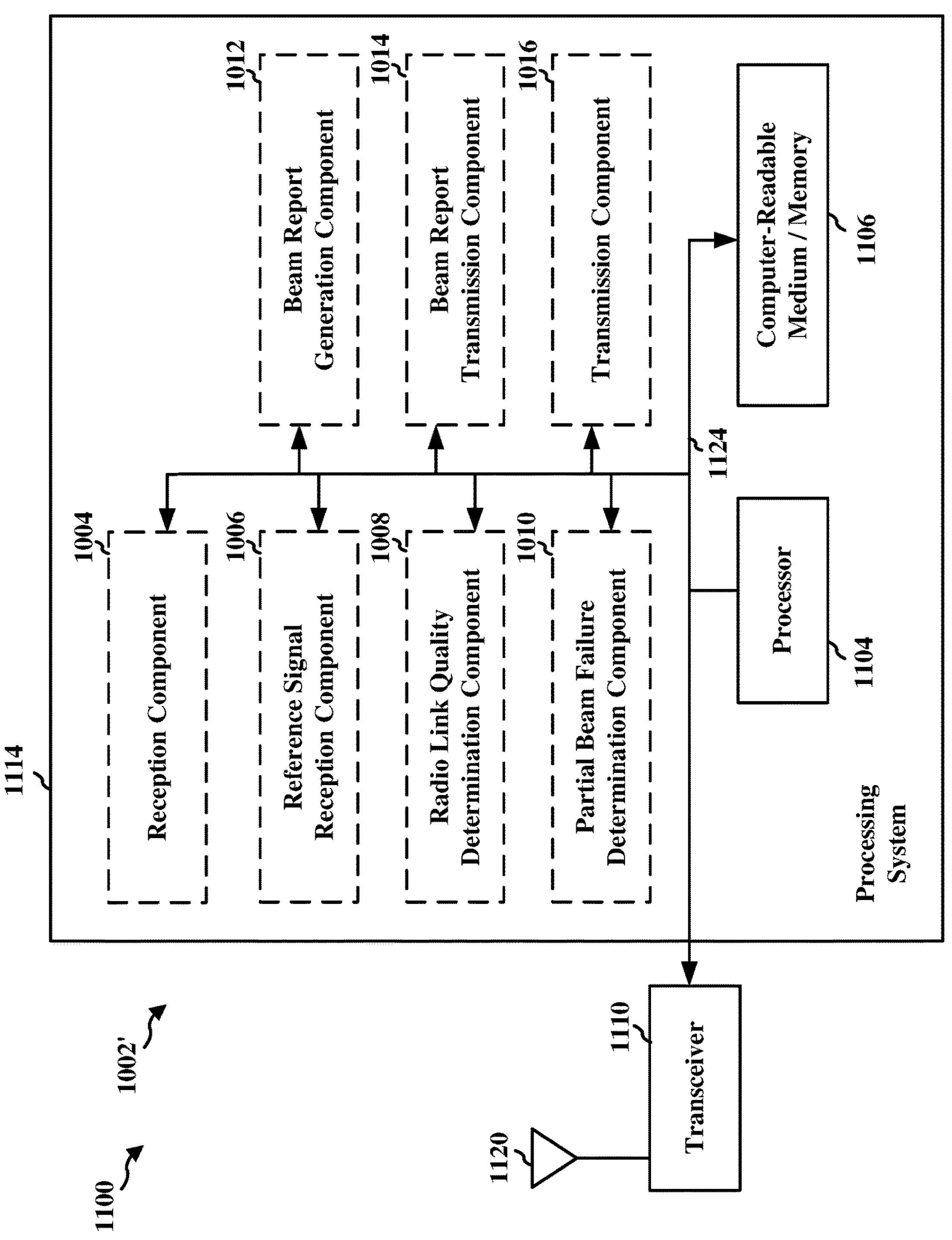
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1016, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving a set of beam failure detection reference signals, means for transmitting a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold, means for receiving a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold, means for receiving a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by the amount greater than or equal to a difference threshold, and means for receiving control information in response to the beam report. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
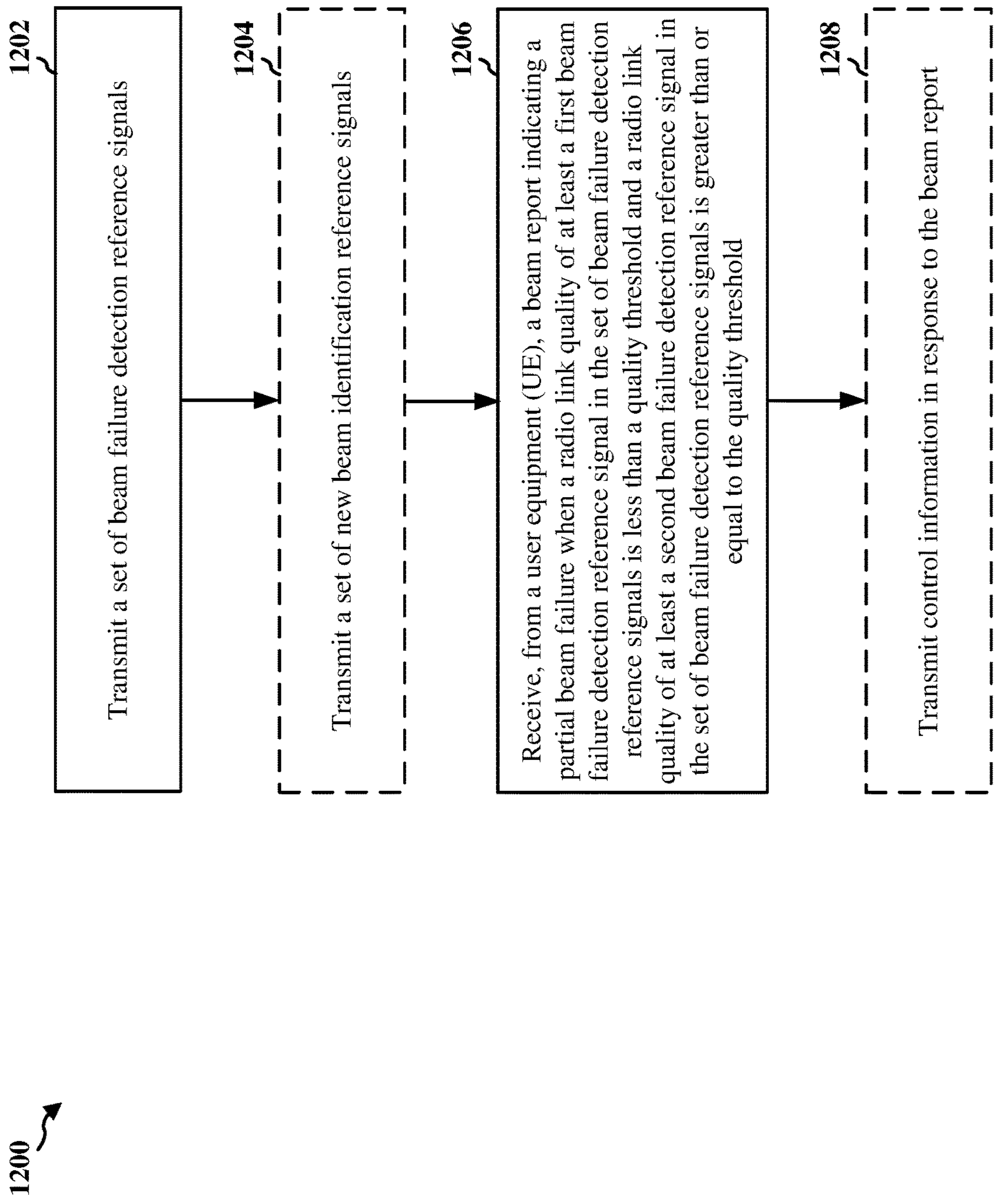
FIG. 12 is a flowchart of a method of wireless communication.

FIG. 12 is a flowchart 1200 of a method of wireless communication. The method may be performed by a base station (e.g., the base station 402; the apparatus 1302/1302'; the processing system 1414, which may include the memory 376 and which may be the entire base station 402 or a component of the base station 402, such as the TX processor 316, the RX processor 370, and/or the controller/processor 375). In FIG. 12, blocks indicated with dashed lines represent optional blocks.

At 1202, the base station transmits a set of beam failure detection reference signals. In some examples, the set of beam failure detection reference signals may include one or more SS/PBCH blocks and/or one or more CSI-RSs. For example, with reference to FIG. 4, the base station 402 may configure the UE 404 with a set of beam failure detection reference signals 408. In some examples, the set of beam failure detection reference signals 408 may include N beam failure detection reference signals, where N represents a positive integer. The base station 402 may transmit the set of beam failure detection reference signals 408 to the UE 404. For example, as shown in FIG. 4, the base station 402 may transmit a first beam failure detection reference signal 410 through an Nth beam failure detection reference signal 412 using a beam (e.g., the beam 508 in FIG. 5) of the beam pair link established with the UE 404.

At 1204, the base station transmits a set of new beam identification reference signals. In some examples, the set of new beam identification reference signals may include one or more SS/PBCH blocks and/or one or more CSI-RSs. For example, with reference to FIG. 4, the base station 402 may configure the UE 404 with a set of new beam identification reference signals 414. In some examples, the set of new beam identification reference signals 414 may include K new beam identification reference signals 414, where K represents a positive integer. The base station 402 may transmit the set of new beam identification reference signals 414 to the UE 404. For example, as shown in FIG. 4, the base station 402 may transmit a first new beam identification reference signal 416 through a Kth new beam identification reference signal 418 using a beam (e.g., the beam 512 in FIG. 5) different from a beam (e.g., the beam 508 in FIG. 5) of the beam pair link established with the UE 404.

At 1206, the base station receives, from a UE, a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

For example, with reference to FIG. 4, at 426, the UE 404 may generate a beam report 428 including at least an indication of the partial beam failure. The UE 404 may transmit the beam report 428 to the base station 402. In some aspects of the disclosure, the beam report 428 may include a beam failure recovery MAC-CE, such as the beam failure recovery MAC-CE 600, the beam failure recovery MAC-CE 700, or the beam failure recovery MAC-CE 800 described herein. The beam failure recovery MAC-CE may include at least one field for indicating whether or not a partial beam failure has occurred (also referred to as a partial beam failure indication field).

Finally, at 1208, the base station optionally transmits control information in response to the beam report. For example, with reference to FIG. 4, the base station 402 may transmit control information 430 to the UE 404 in response to the beam report 428.

In some examples, an indication (e.g., in the beam report 428) that a partial beam failure has occurred may trigger the base station 402 to transmit a CSI report request. In these aspects, for example, the control information 430 from the base station 402 may include a request for a CSI report. In some examples, a CSI report from the UE 404 may enable the base station 402 to obtain information for purposes of determining whether a beam adjustment may be performed to avoid a full beam recovery procedure.

In some examples, if the beam report 428 from the UE 404 includes an indication that a partial beam failure has occurred and includes an index value identifying a beam failure detection reference signal that is in a failure condition, the base station 402 may transmit the control information 430 including a CSI report request in response to the beam report 428. For example, the base station 402 may receive a CSI report from the UE 404 and may use the information in the CSI report to update the PDCCH beam associated with the beam failure detection reference signal that is in a failure condition.

In some examples, if the beam report 428 includes an indication that a partial beam failure has occurred, an index value identifying a beam failure detection reference signal that is in a failure condition, and an index value identifying a new beam identification reference signal (e.g., a new beam identification reference signal having a radio link quality that exceeds the radio link quality of the beam failure detection reference signal in a failure condition by an amount greater than or equal to a difference threshold), the base station 402 may transmit the control information 430 including a CSI report request in response to the beam report 428. For example, the base station 402 may receive a CSI report from the UE 404 and may use the information in the CSI report along with the index value identifying the new beam identification reference signal to update the PDCCH beam associated with the beam failure detection reference signal that is in a failure condition. For example, the base station 402 may update the PDDCH beam based on a beam associated with the new beam identification reference signal.

Figure 13:
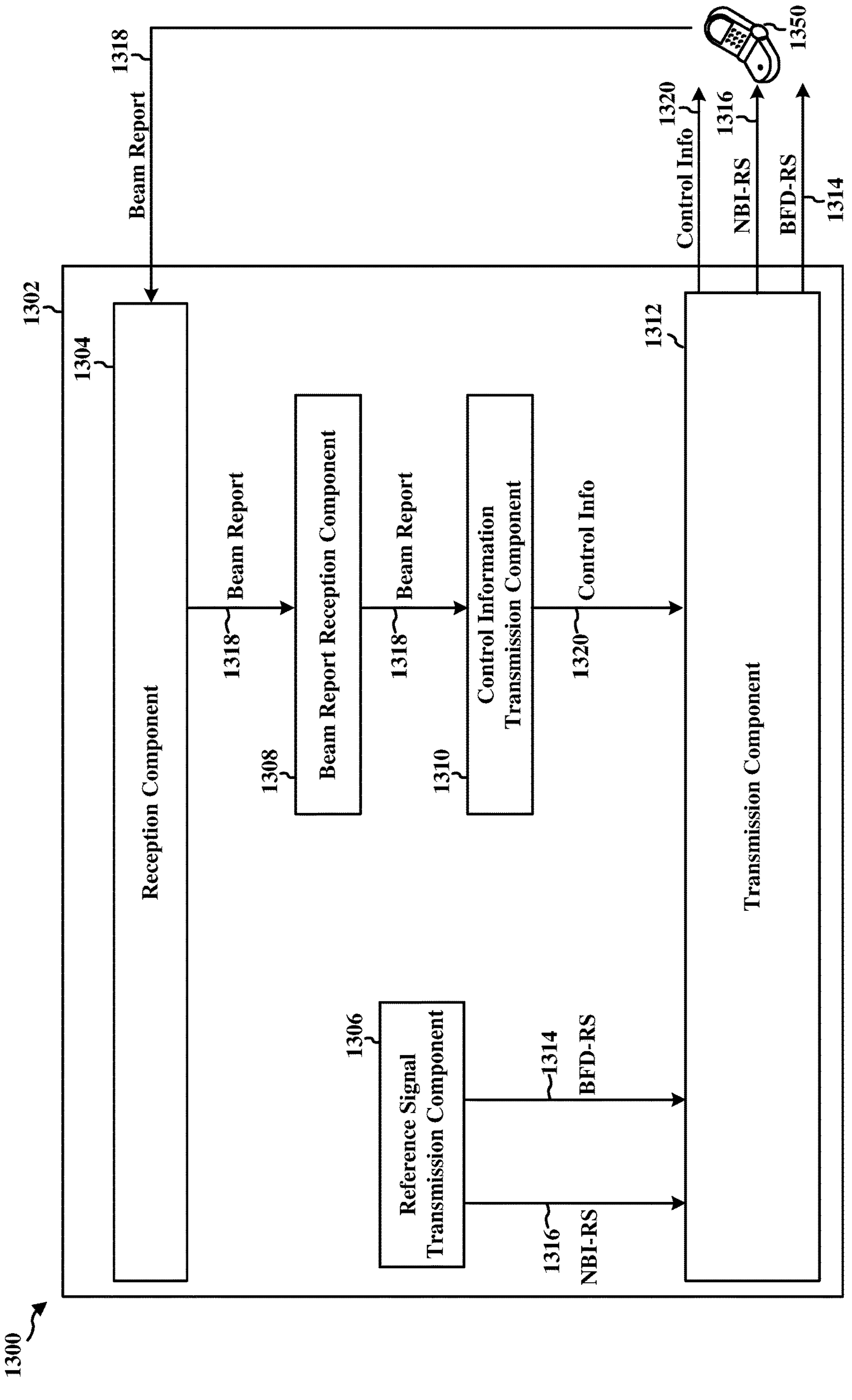
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a base station.

The apparatus includes a reception component 1304 that receives uplink signals from a UE (e.g., the UE 1350). For example, the uplink signals may include the beam report 1318. The beam report 1318 may correspond to the beam report described herein (e.g., the beam report 428 in FIG. 4).

The apparatus further includes a reference signal transmission component 1306 that transmits (e.g., via the transmission component 1312) a set of beam failure detection reference signals and/or a set of new beam identification reference signals. For example, the reference signal transmission component 1006 may transmit the BFD-RS 1314 and/or the NBI-RS 1316.

The apparatus further includes a beam report reception component 1308 that receives the beam report 1318 (e.g., via the reception component 1304).

The apparatus further includes a control information transmission component 1310 that transmits control information 1320 (e.g., via the transmission component 1312) to the UE 1350.

The apparatus further includes a transmission component 1312 that transmits downlink signals to the UE 1350. For example, the downlink signals may include a set of beam failure detection reference signals (e.g., one or more beam failure detection reference signals, such as the BFD-RS 1314), a set of new beam identification reference signals (e.g., one or more new beam identification reference signals, such as the NBI-RS 1316), and/or a signal containing the control information 1320.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
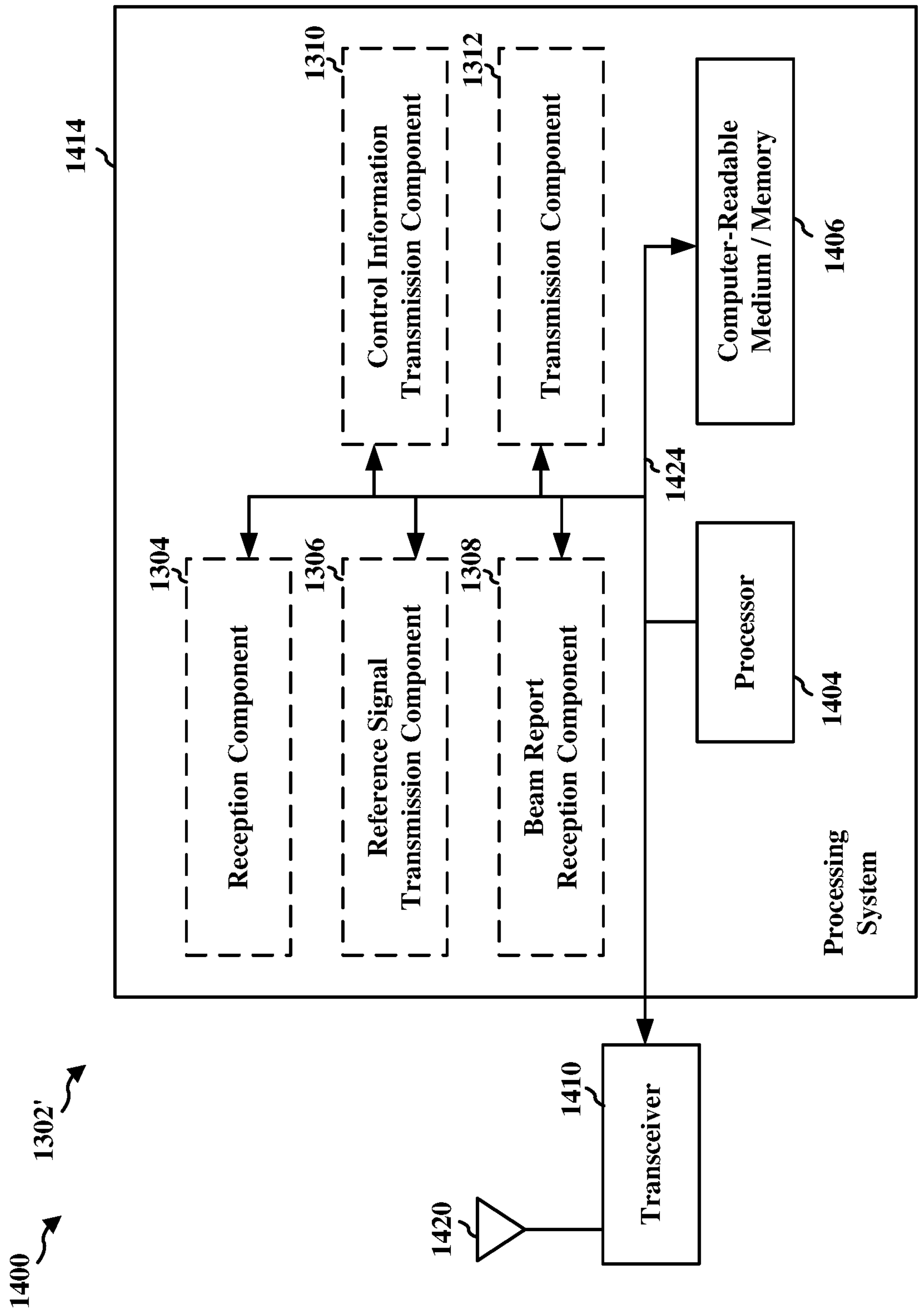
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1312, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302/1302' for wireless communication includes means for transmitting a set of beam failure detection reference signals, means for receiving, from a user equipment (UE), a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold, means for transmitting a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold, means for transmitting a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by the amount greater than or equal to the difference threshold, and means for transmitting control information in response to the beam report. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Therefore, the aspects described herein may improve beam management at a UE (e.g., the UE 404) by allowing the UE to proactively transmit a beam report before all beam failure detection reference signals in a set of beam failure detection reference signals configured for the UE are in a failure condition. For example, the beam report may indicate a partial beam failure when a radio link quality of at least a first beam failure detection reference signal in a set of beam failure detection reference signals is less than a quality threshold and a radio link quality of at least a second beam failure detection reference signal in the set of beam failure detection reference signals is greater than or equal to the quality threshold. This may allow the network (e.g., the base station 402) to adjust or change existing beams and avoid a full beam recovery procedure at the UE.

In some aspects, the beam report may include a beam failure recovery MAC-CE (e.g., the beam failure recovery MAC-CE 600, 700, 800 described herein). In some examples, the beam report may not increase the overhead in the uplink since the UE may transmit the beam failure recovery MAC-CE in place of padding bits for an uplink transmission in an uplink data channel (e.g., PUSCH).

In some aspects of the disclosure, the UE may include additional information (e.g., in addition to the indication of a partial beam failure) in the beam report, such as an index value identifying a beam failure detection reference signal (e.g., in the set of beam failure detection reference signals) in a failure condition and/or an index value identifying a new beam identification reference signal (e.g., a candidate reference signal) having a higher radio link quality (e.g., by an amount greater than or equal to a difference threshold) than the radio link quality of the beam failure detection reference signal in a failure condition. This additional information may assist the network (e.g., the base station 402) to more efficiently adjust or change existing beams and avoid a full beam recovery procedure at the UE.

The following provides an overview of aspects of the present disclosure:

Aspect 1: A method of wireless communication for an apparatus, comprising: receiving a set of beam failure detection reference signals; and transmitting a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

Aspect 2: The method of aspect 1, wherein the beam report includes an index value identifying the first beam failure detection reference signal in the set of beam failure detection reference signals.

Aspect 3: The method of aspect 1 or 2, wherein the beam report further includes a medium access control (MAC) control element (CE) containing a first field and a second field, wherein a first value in the first field indicates whether the radio link quality of at least the first beam failure detection reference signal is less than the quality threshold and the radio link quality of at least the second beam failure detection reference signal is greater than or equal to the quality threshold, and wherein the second field includes the index value identifying the first beam failure detection reference signal in the set of beam failure detection reference signals when the radio link quality of at least the first beam failure detection reference signal is less than the quality threshold.

Aspect 4: The method of any of aspects 1 through 3, further comprising: receiving a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold.

Aspect 5: The method of any of aspects 1 through 4, wherein the beam report further includes a second index value identifying the first beam failure detection reference signal when the radio link quality of the new beam identification reference signal exceeds the radio link quality of the first beam failure detection reference signal, or identifying the second beam failure detection reference signal when the radio link quality of the new beam identification reference signal exceeds the radio link quality of the second beam failure detection reference signal.

Aspect 6: The method of any of aspects 1 through 5, wherein the beam report further includes a medium access control (MAC) control element (CE) containing at least a first field, wherein a first value in the first field indicates whether the radio link quality of at least the first beam failure detection reference signal is less than the quality threshold and the radio link quality of at least the second beam failure detection reference signal is greater than or equal to the quality threshold.

Aspect 7: The method of any of aspects 1 through 6, wherein the medium access control (MAC) control element (CE) further contains a second field, wherein the second field includes the second index value identifying the first beam failure detection reference signal when the radio link quality of the new beam identification reference signal exceeds the radio link quality of the first beam failure detection reference signal by the amount greater than or equal to the difference threshold, or identifying the second beam failure detection reference signal when the radio link quality of the new beam identification reference signal exceeds the radio link quality of the second beam failure detection reference signal by the amount greater than or equal to the difference threshold.

Aspect 8: The method of any of aspects 1 through 7, wherein the medium access control (MAC) control element (CE) further contains a third field, wherein the third field includes the first index value identifying the new beam identification reference signal when the radio link quality of the new beam identification reference signal exceeds at least one of the radio link quality of the first beam failure detection reference signal or the radio link quality of the second beam failure detection reference signal by the amount greater than or equal to the difference threshold.

Aspect 9: The method of any of aspects 1 through 3, further comprising: receiving a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by an amount greater than or equal to a difference threshold.

Aspect 10: The method of any of aspects 1 through 9, wherein the beam report includes a medium access control (MAC) control element (CE) containing a field for indicating the partial beam failure.

Aspect 11: The method of aspect 10, wherein a value in the field for indicating the partial beam failure indicates whether the radio link quality of at least the first beam failure detection reference signal is less than the quality threshold and the radio link quality of at least the second beam failure detection reference signal is greater than or equal to the quality threshold.

Aspect 12: The method of aspect 10 or 11, wherein the field for indicating the partial beam failure is associated with a component carrier.

Aspect 13: The method of any of aspects 1 through 12, wherein the beam report includes a medium access control (MAC) control element (CE), and wherein the MAC-CE is transmitted in an uplink data channel allocated to the apparatus in a serving cell.

Aspect 14: The method of any of aspects 1 through 13, wherein the beam report includes a medium access control (MAC) control element (CE), wherein the MAC-CE is transmitted in an uplink data channel allocated to the apparatus in a serving cell when a number of padding bits for the uplink data channel is greater than or equal to a total number of bits included in the MAC-CE and a subheader of the MAC-CE.

Aspect 15: The method of any of aspects 1 through 14, further comprising: receiving control information in response to the beam report.

Aspect 16: An apparatus for wireless communication, comprising: a memory; and at least one processor coupled to the memory and configured to perform a method of any one of aspects 1 through 15.

Aspect 17: An apparatus for wireless communication comprising at least one means for performing a method of any one of aspects 1 through 15.

Aspect 18: A computer-readable medium storing computer executable code, the code when executed by a processor cause the processor to perform a method of any one of aspects 1 through 15.

Aspect 19: A method of wireless communication, comprising: transmitting a set of beam failure detection reference signals; and receiving, from a user equipment (UE), a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold.

Aspect 20: The method of aspect 19, wherein the beam report includes an index value identifying the first beam failure detection reference signal in the set of beam failure detection reference signals.

Aspect 21: The method of aspect 19 or 20, further comprising: transmitting a set of new beam identification reference signals, wherein the beam report includes a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold.

Aspect 22: The method of any of aspects 19 through 21, wherein the beam report further includes a second index value identifying the first beam failure detection reference signal when the radio link quality of the new beam identification reference signal exceeds the radio link quality of the first beam failure detection reference signal, or identifying the second beam failure detection reference signal when the radio link quality of the new beam identification reference signal exceeds the radio link quality of the second beam failure detection reference signal.

Aspect 23: The method of aspect 19 or 20, further comprising: transmitting a set of new beam identification reference signals, wherein the beam report includes an index value identifying a new beam identification reference signal in the set of new beam identification reference signals when a radio link quality of the new beam identification reference signal exceeds each radio link quality of each beam failure detection reference signal in the set of beam failure detection reference signals by the amount greater than or equal to the difference threshold.

Aspect 24: The method of any of aspects 19 through 23, further comprising: transmitting control information in response to the beam report.

Aspect 25: An apparatus for wireless communication, comprising: a memory; and at least one processor coupled to the memory and configured to perform a method of any one of aspects 19 through 24.

Aspect 26: An apparatus for wireless communication comprising at least one means for performing a method of any one of aspects 19 through 24.

Aspect 27: A computer-readable medium storing computer executable code, the code when executed by a processor cause the processor to perform a method of any one of aspects 19 through 24.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:

at least one transceiver;

at least one memory comprising instructions; and at least one processor coupled configured to execute the instructions to cause the apparatus to:

receive, via the at least one transceiver, a set of beam failure detection reference signals;

receive, via the at least one transceiver, a set of new beam identification reference signals; and transmit, via the at least one transceiver, a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold, wherein the beam report includes:

a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold, or an index value identifying a new beam identification reference signal in the set of new beam identification reference signals when a radio link quality of the new beam identification reference signal exceeds each radio link quality of each beam failure detection reference signal in the set of beam failure detection reference signals by an amount greater than or equal to a difference threshold.

2. The apparatus of claim 1, wherein the beam report further includes an index value identifying the first beam failure detection reference signal in the set of beam failure detection reference signals.

3. The apparatus of claim 2, wherein the beam report further includes a medium access control (MAC) control element (CE) containing a first field and a second field, wherein a first value in the first field indicates whether the radio link quality of at least the first beam failure detection reference signal is less than the quality threshold and the radio link quality of at least the second beam failure detection reference signal is greater than or equal to the quality threshold, and wherein the second field includes the index value identifying the first beam failure detection reference signal in the set of beam failure detection reference signals when the radio link quality of at least the first beam failure detection reference signal is less than the quality threshold.

4. The apparatus of claim 1, wherein the beam report further includes a second index value identifying the first beam failure detection reference signal when the radio link quality of the new beam identification reference signal exceeds the radio link quality of the first beam failure detection reference signal, or identifying the second beam failure detection reference signal when the radio link quality of the new beam identification reference signal exceeds the radio link quality of the second beam failure detection reference signal.

5. The apparatus of claim 4, wherein the beam report further includes a medium access control (MAC) control element (CE) containing at least a first field, wherein a first value in the first field indicates whether the radio link quality of at least the first beam failure detection reference signal is less than the quality threshold and the radio link quality of at least the second beam failure detection reference signal is greater than or equal to the quality threshold.

6. The apparatus of claim 5, wherein the medium access control (MAC) control element (CE) further contains a second field, wherein the second field includes the second index value identifying the first beam failure detection reference signal when the radio link quality of the new beam identification reference signal exceeds the radio link quality of the first beam failure detection reference signal by the amount greater than or equal to the difference threshold, or identifying the second beam failure detection reference signal when the radio link quality of the new beam identification reference signal exceeds the radio link quality of the second beam failure detection reference signal by the amount greater than or equal to the difference threshold.

7. The apparatus of claim 6, wherein the medium access control (MAC) control element (CE) further contains a third field, wherein the third field includes the first index value identifying the new beam identification reference signal when the radio link quality of the new beam identification reference signal exceeds at least one of the radio link quality of the first beam failure detection reference signal or the radio link quality of the second beam failure detection reference signal by the amount greater than or equal to the difference threshold.

8. The apparatus of claim 1, wherein the beam report further includes a medium access control (MAC) control element (CE) containing a field for indicating the partial beam failure.

9. The apparatus of claim 8, wherein a value in the field for indicating the partial beam failure indicates whether the radio link quality of at least the first beam failure detection reference signal is less than the quality threshold and the radio link quality of at least the second beam failure detection reference signal is greater than or equal to the quality threshold.

10. The apparatus of claim 8, wherein the field for indicating the partial beam failure is associated with a component carrier.

11. The apparatus of claim 1, wherein the beam report further includes a medium access control (MAC) control element (CE), and wherein the MAC-CE is transmitted in an uplink data channel allocated to the apparatus in a serving cell.

12. The apparatus of claim 1, wherein the beam report further includes a medium access control (MAC) control element (CE), wherein the MAC-CE is transmitted in an uplink data channel allocated to the apparatus in a serving cell when a number of padding bits for the uplink data channel is greater than or equal to a total number of bits included in the MAC-CE and a subheader of the MAC-CE.

13. An apparatus for wireless communication, comprising:

at least one transceiver;

at least one memory comprising instructions; and at least one processor coupled configured to execute the instructions to cause the apparatus to:

transmit, via the at least one transceiver, a set of beam failure detection reference signals;

transmit, via the at least one transceiver, a set of new beam identification reference signals; and receive, from a user equipment (UE) via the at least one transceiver, a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold, wherein the beam report includes:

a first index value identifying a new beam identification reference signal in the set of new beam identification reference signals when a radio link quality of the new beam identification reference signal exceeds at least one of the radio link quality of the first beam failure detection reference signal or the radio link quality of the second beam failure detection reference signal by an amount greater than or equal to a difference threshold, or an index value identifying a new beam identification reference signal in the set of new beam identification reference signals when a radio link quality of the new beam identification reference signal exceeds each radio link quality of each beam failure detection reference signal in the set of beam failure detection reference signals by an amount greater than or equal to a difference threshold.

14. The apparatus of claim 13, wherein the beam report further includes an index value identifying the first beam failure detection reference signal in the set of beam failure detection reference signals.

15. The apparatus of claim 13, wherein the beam report further includes a second index value identifying the first beam failure detection reference signal when the radio link quality of the new beam identification reference signal exceeds the radio link quality of the first beam failure detection reference signal, or identifying the second beam failure detection reference signal when the radio link quality of the new beam identification reference signal exceeds the radio link quality of the second beam failure detection reference signal.

16. An apparatus for wireless communication, comprising:

at least one transceiver;

at least one memory comprising instructions; and at least one processor coupled configured to execute the instructions to cause the apparatus to:

receive, via the at least one transceiver, a set of beam failure detection reference signals; and transmit, via the at least one transceiver, a beam report indicating a partial beam failure when a radio link quality of at least a first beam failure detection reference signal in the set of beam failure detection reference signals is less than a quality threshold and a radio link quality of at least a second beam failure detection reference signal in the set of beam failure detection reference signals is greater than or equal to the quality threshold, wherein:

the beam report includes a medium access control (MAC) control element (CE), and the MAC-CE is transmitted in an uplink data channel allocated to the apparatus in a serving cell when a number of padding bits for the uplink data channel is greater than or equal to a total number of bits included in the MAC-CE and a subheader of the MAC-CE.

* * * * *